United States Patent [19]
LeBleu

[11] Patent Number: 5,845,504
[45] Date of Patent: *Dec. 8, 1998

[54] PORTABLE/POTABLE WATER RECOVERY AND DISPENSING APPARATUS

[75] Inventor: Terry L. LeBleu, San Antonio, Tex.

[73] Assignee: Worldwide Water, Inc., Boerne, Tex.

[ * ] Notice: The term of this patent shall not extend beyond the expiration date of Pat. No. 5,669,221.

[21] Appl. No.: 802,489

[22] Filed: Feb. 20, 1997

Related U.S. Application Data

[63] Continuation-in-part of Ser. No. 629,305, Apr. 8, 1996, Pat. No. 5,669,221.

[51] Int. Cl.$^6$ ..................................... F25D 17/06
[52] U.S. Cl. ................................. 62/92; 62/285
[58] Field of Search ............................. 62/272, 92, 285, 62/288, 290, 291, 125, 129; 210/669, 754, 764, 753, 683, 681

[56] References Cited

U.S. PATENT DOCUMENTS 5,106,512  4/1992  Reidy ........................................ 62/272
5,669,221  9/1997  LeBleu et al. ............................ 62/272

*Primary Examiner*—John M. Sollecito
*Attorney, Agent, or Firm*—Blackwell Sanders Peper Martin

[57] ABSTRACT

A portable, potable-water generator for producing high-purity liquid water by condensation of dew from ambient air is described. The generator employs filtration subsystems to remove particulates and aerosols from the incoming air. An enclosed heat absorber cools the filtered air below its dew point and collects droplets of condensate into a closed system. The collected liquid dew is further continually treated in a bacteriostat loop to destroy adventitious living organisms and to filter out undesirable and dangerous contaminants. All the subsystems are failsafe-interlocked to disable the generator immediately and prevent delivery of water if any one of them stops functioning within predetermined safe limits. Hybrid embodiments of the water generator attached to or integrated with refrigeration-type appliances such as water coolers, refrigerators, freezers, icemakers and air-conditioners are illustrated.

29 Claims, 17 Drawing Sheets

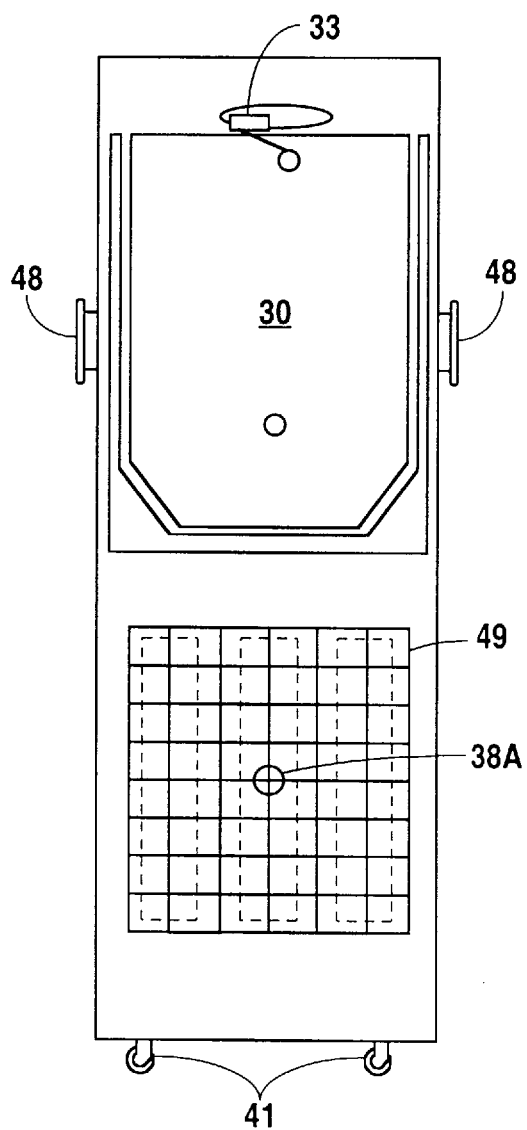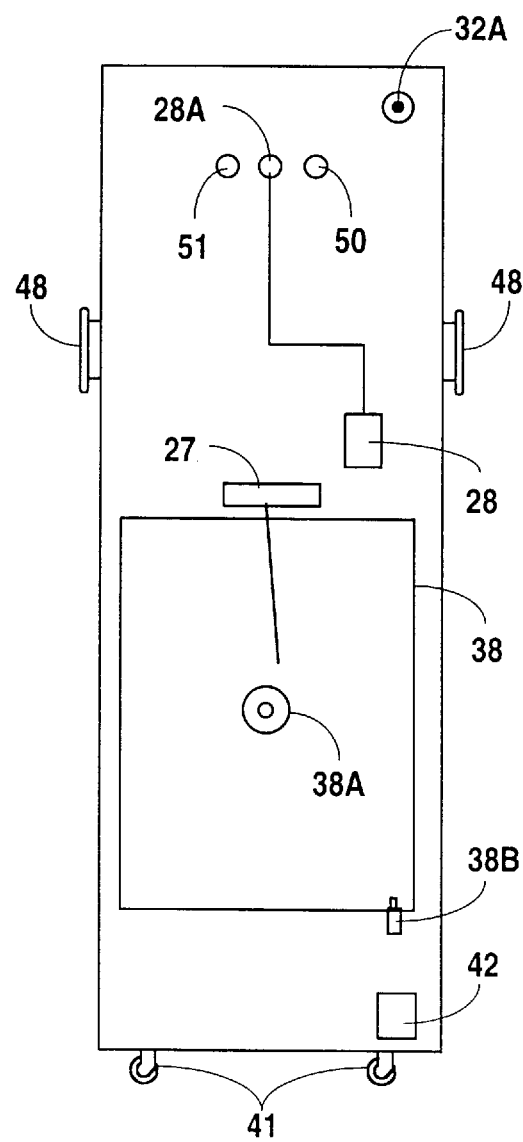
Fig. 3
Fig. 4

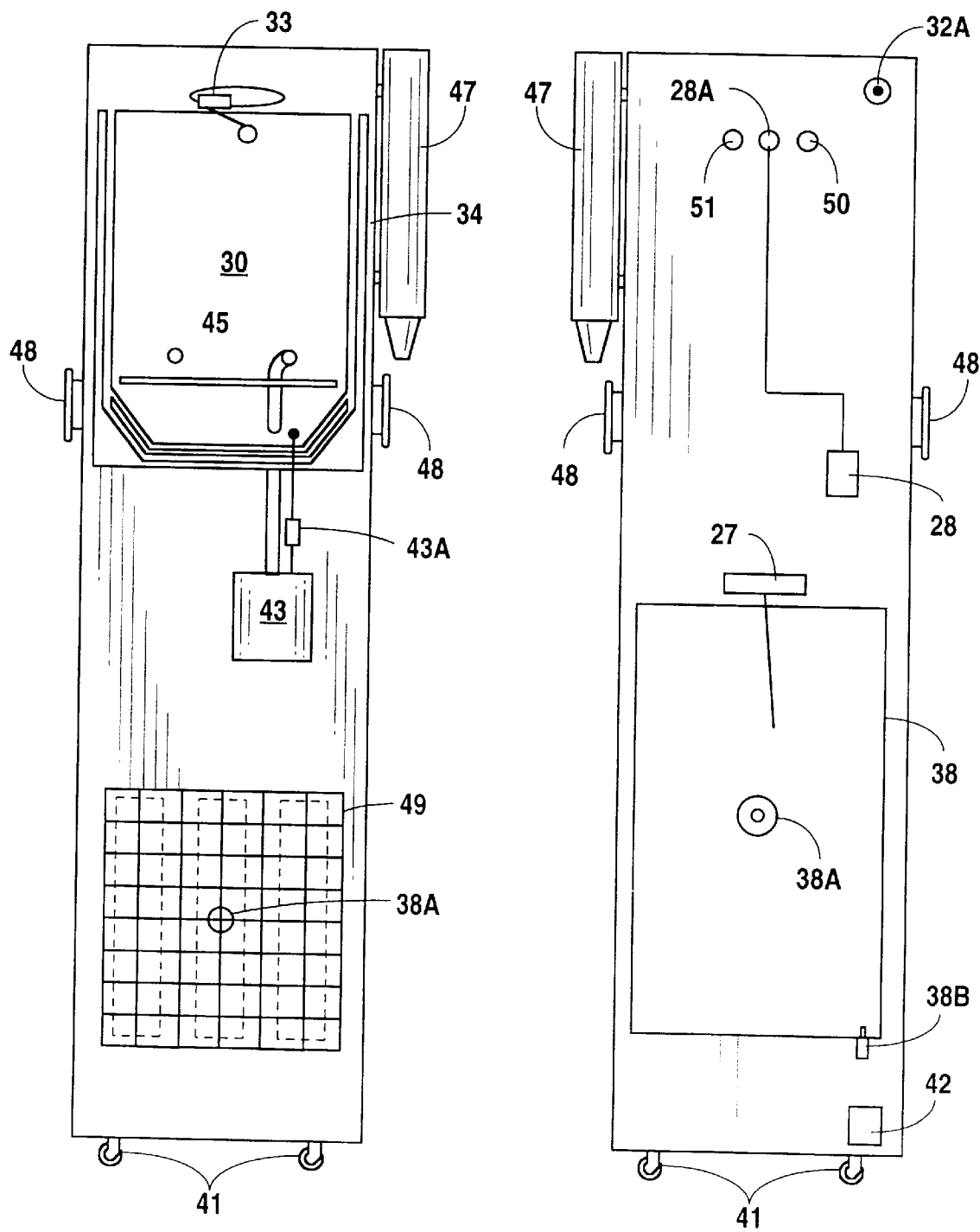

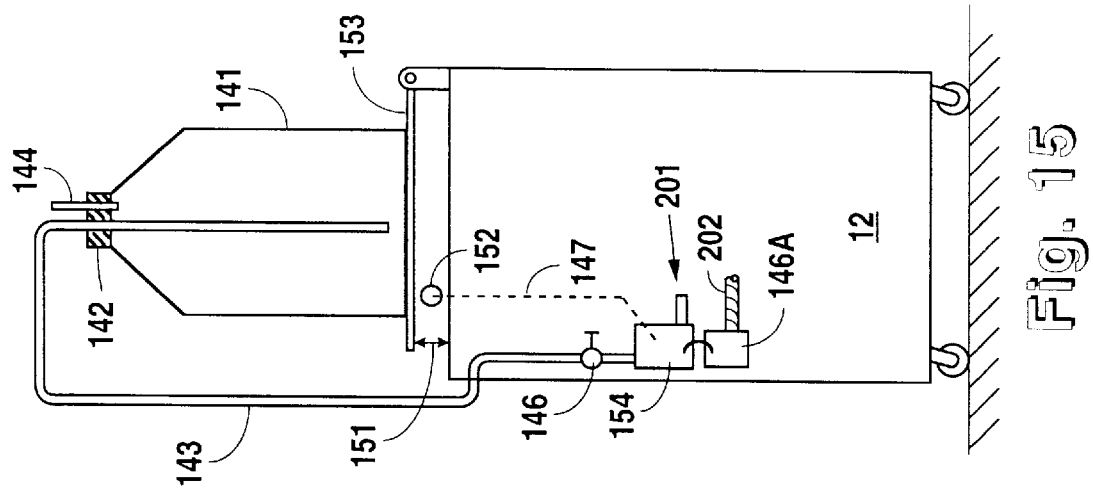
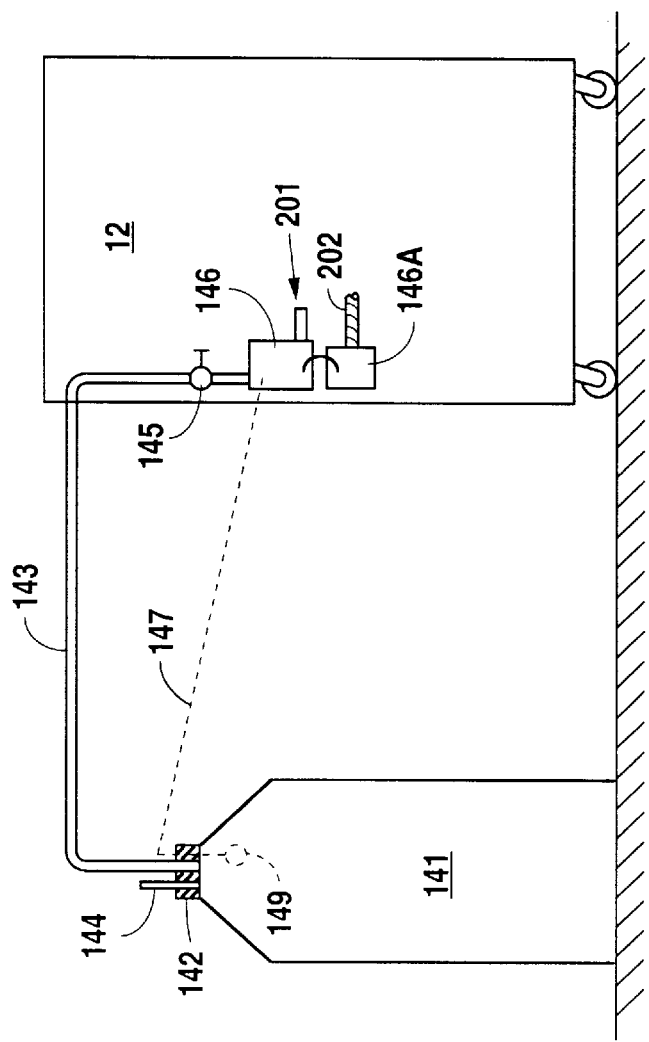

PORTABLE/POTABLE WATER RECOVERY AND DISPENSING APPARATUS

RELATED APPLICATIONS

This is a CIP filing which claims the priority of the original application Ser. No. 08/629,305, filed Apr. 8, 1996 now U.S. Pat. No. 5,669,221 and a subsequent USProv app. mailed Dec. 31, 1996 w. Certificate of Mailing (PTO response still pending on Feb. 20, 1997).

FIELD OF INVENTION

This invention relates to a portable, potable water dispenser capable of recovering liquid water for human use from the humidity of environmental air and sanitizing it for human use. The water generator of this invention draws in moisture-laden air from the surroundings and recovers liquid water by cooling the stream of air below its dew point. The unit can be powered from mains or portable generators, AC, 110–220 V, 50–60 Hz, or from DC power, 6–60 V batteries, or a portable generator. The apparatus includes optional air filters which remove suspended pollen or dust particles so that contaminants and undesirable impurities from the environmental air are not carried into the dew-forming section. The apparatus also includes optional heating, cooling, filtration and sterilization systems which provide purified liquid water at multiple, different temperatures. The external envelope of the present apparatus is a compact, attractive, wheeled design and one embodiment is adapted to prevent entry of insects. The water generators of this invention employ ruggedized design and construction and certain embodiments are intended to operate untended for extended periods in harsh, military-type environments such as peacekeeping actions, fires, earthquakes and weather disasters/emergencies. Other embodiments are intended to operate in business or home office environments. Further embodiments lend themselves to incorporation into refrigerators, drink coolers, water coolers, etc.

BACKGROUND OF THE INVENTION

The consensus of most medical experts is that the water supply is the single most critical factor to human health. Over 400,000 people were stricken, 4,000 hospitalized and over 100 people died in Milwaukee in 1993 from Cryptosporidium, a bacterial contaminant in their city-treated drinking water. Natural Resources Defense Council estimates that in the US alone more than 900,000 become ill each year from water-borne disease and as many as 900 will die. There is also an increasing awareness that "bottled water" itself may be no safer than municipally treated water. Some citizens feel protected by household-type water filters. However, of the over 2,000 types/styles/sizes of filters now being sold to the public for additional treating of city water, only a few remove significant amounts of parasites, viruses, bacteria, pesticides and heavy metals. While contaminated water is harmful to adults, infants and young children are at much greater risk from drinking impure water, particularly water with high levels of heavy metals or radioisotopes.

While the situation is bad in parts of the United States, it is worse in many other developed countries and absolutely frightening in third-world countries. In developing nations, there is often at least intermittent electricity but no source for potable, or human drinking water. For clinics and hospitals in such remote areas, doctors and technicians need purified water for scrubbing and to prepare medicines. In the case of remote villages in developing countries, there is a need for a unit which generates and dispenses purified water, is easily moved, is relatively inexpensive to manufacture and which can operate from a variety of different types of electrical power with a minimum of maintenance. The most common potable water dispenser for use in the home and office is the 20-liter glass or plastic bottle placed on a gravity-flow dispensing stand. The bottles usually provide processed spring or well water and are generally sold with a representation of compliance with state and local health codes for potable water. One major drawback to "bottled water" is the fact that filled containers are heavy, approx. 25–30 Kg, and awkward to change. Another problem is that algae can build up in the user's stand; this necessitates periodic cleaning to maintain water safety. Relative to dissolved and suspended contaminants and undesired impurities, "bottled water" may be no safer than municipal water. At this time, the USA market for portable, potable water sources requires: (a) generation of high-quality water which is certifiably free of all impurities which are health hazards even to infants and children, (b) no necessity for storing and moving heavy bottles, (c) no requirement for expensive, complex maintenance procedures/cleaning, (d) low operating cost, (e) no special wiring/plumbing for installation and (f) attractive, office-furniture styling.

Relevant Publications

Current EPA standards for impurities in primary and secondary drinking water are included at p.32–34 of the publication, "Drinking Water Treatment Units Certified by NSF International", NSF International, Ann Arbor, Mich. (1995). These 1995 drinking water-standards of US Environmental Protection Agency are included by reference.

There are several US patents which disclose reverse-cycle refrigeration as the cooling means for a water generator:

U.S. Pat. No. 3,675,442, issued Jul. 1972 to Swanson, Swanson-442

U.S. Pat. No. 4,204,956, issued May 1980 to Flatow, Flatow-956

U.S. Pat. No. 5,149,446, issued Jan. 1991, to J J Reidy, Reidy-446;

U.S. Pat. No. 5,106,512, issued Apr. 1991 to J J Reidy, Reidy-512;

U.S. Pat. No. 5,227,053, issued Jul. 1993 to Brym, Brym-053

U.S. Pat. No. 5,259,203, issued Nov. 1993 to DR Engel et al, Engle-203; and

U.S. Pat. No. 5,301,516, issued Apr. 1994 to F Poindexter, Poindexter-516.

U.S. Pat. No. 5,517,829, issued May 1996 to Michael, Michael-829

U.S. Pat. No. 5,553,459, issued Sep. 1996 to Harrison, Harrison-459

None of the water generators disclosed in these publications are designed primarily as a dispenser and, none are designed as portable units. Swanson-442, provides a large, heavy apparatus, and specifically teaches that small, portable units are relatively inefficient.

None of these publications disclose the following features or embodiments:

Compact, wheeled, office-equipment housing

Integral, external fluid-delivery valves and controls

Ion generator for discharged air stream

Insect-resistant port covers/screens, access doors, edge joints

Ultrasonic pest deterrent

Ozone generator for water sterilization treatment

Handle grips for easy movement by lifting or rolling

Medical/food-handling-type tubing and joints for water handling subsystems

Chemically-inert, thermally-conductive dew-collector surface films

Working fluids in heat absorbers which comply with 1996-edition DOE, EPA and ASHRAE standards/regulations (such as refrigerant fluid 406A)

Ruggedized, long-life components and sub-systems

Safe, convenient dispensing height for hot or cold water

Electrostatic air filter with whistle alarm for blocked condition

Attached liquid container dispenser

Night lights for controls and delivery valves for low-light situations.

Air-heating strip and fan instead of hot-gas bypass circuit on compressor (for outside units).

The publications noted above disclose: (a) industrial water-condensation units designed to be permanently-attached to building air ducts, or (b) water purifiers, not portable dispensers. Reidy-512 discloses a fixed-position, large-volume, high-rate water generator suitable for supplying drinking water to an entire office building, laundry, etc. The device is described as "having ducts for bringing this supply of ambient air to the device and for releasing the air back outside the device after it has been processed". The attached, permanent "ductwork" is characterized further as "extending through an outside wall of the structure or dwelling". While sensors, indicators, interlocks, alarms for the UV lamps, air filters and water filters are mentioned briefly in Reidy-512, other major components of the apparatus are usually characterized by single-word descriptions such as "air filter element", "evaporator coils", "condenser coils", etc.

In both of Reidy's patents, the drain is located on the base of his water generator, a position which makes the drains completely unsuitable for dispensing water unless the machine is placed on legs or mounted in a cabinet. Reidy-512 teaches two passes of water past ultraviolet light to kill bacteria whereas the present apparatus provides for automatic, continuous recirculation of the water in the final delivery reservoir through a UV bacteriostat zone. Reidy-512 has a number of additional limitations and shortcomings: the user must set the humidistat and thermostat. Reidy makes no provision for insect proofing of the cabinet. The water filter of Reidy-512 is located under the collection pan and severely limited in both flow rate and minimum pore size by the gravity-feed pressure head. In the present apparatus, water flows through a filter and is under pressure from a pump; this allows for high rates and small-pore, filter/adsorption media such as a porous-carbon block.

Poindexter-516 has no germicidal light nor a remote collection diverter valve. A drain is shown in FIG. 2 but none on FIG. 1. The drain is shown on the bottom of the apparatus which, if on the floor, is essentially inoperable and, if raised on a stand, makes a top-heavy unit which would require permanent wall anchors.

Engle-203 is essentially two tandem dehumidifiers. A second-stage compressor with its condenser coil immersed in the storage tank produces heated water. One familiar with the art realizes that such heated water would never reach 75° C. as does the heated water in the present apparatus.

A further problem of locating the condenser coil in the storage tank is that it prevents removal of the tank for cleaning without opening the refrigerant system. Still further maintenance problems arise from the positioning of drains, i.e., there are no external dispensing valves and the drain valves are poorly located for replacing the valves because of the limited access inherent in their location.

Poindexter-516 claims a stainless-steel cooling coil and collection pan which adds significantly to the cost of manufacturing and does not specify the specific type of stainless steel, 314L, which is required for water handling in production facilities. The specification goes into great detail on the types of chemicals usable to clean areas which contact the water. In the present apparatus, the storage containers are completely removable and the condensate is sanitized by passing under the germicidal light several times.

Harrison-459 uses a UV lamp to treat the discharge water stream; this indicates that bacteria and or algae may be growing within the unit or its plumbing connections. This unit also must be primed initially with approx. 10 liters of start-up water which can be a source of initial contaminants, such as volatile organic compounds, VOC, which are neither removed nor broken down by either UV radiation or granular carbon charcoal Whether this technology is compliant with NSF-53 remains a question. In his device, the compressor operates to maintain a cold set-point temperature within the water reservoir, i.e., the compressor operates to cool the fluid remaining in the reservoir even when the device is not actively producing water condensate. In contrast, the present invention saves energy by shutting off when it is not producing water. Further, the present invention includes a wheeled, user-friendly cabinet complete with handles, cup holders, diverter valve and air-filter-blockage alert. Also, since the present invention is fitted with a gravity discharge line, it is possible to draw water even in the event of a power failure. Harrison's unit, which employs an electric solenoid valve, would not be able to deliver water in the absence of mains power.

Swanson-442 suffers from many of the same deficiencies as Harrison-459; further, it also lacks an air filter or a UV disinfecting system. While Swanson's discharge device is shown on one figure, the location and operating parameters are not specified.

Brym-053 provides a UV-activated catalyst water purifier/dispenser for tap water (well or public supply) which can be installed below the counter or enclosed in a cabinet. This unit merely treats water supplied to it, and in the process, a certain portion of the incoming flow is diverted to waste. Michael-829 is primarily a device for producing and filtering "drinking" water across "activated charcoal" and a "plastic mesh micropore filter". It is not portable and is not compliant with NSF-57 re VOC removal. Further, it has no provision for continuous circulation of water to maintain purity.

All the prior patents cited above use a typical refrigerant deicer system to keep their evaporators from freezing under low condensate flow rates, which can occur with cool ambient air. For example, on sheet 5 of the Reidy-512 patent is an illustration that shows water production stopping at about 10° C. This limitation occurs because: (a) obtaining condensate is inefficient (b) condensation is not cost effective at such low temperatures and (c), the evaporator tends to freeze over at lower temperatures. This limitation also occurs because of the design of the water generating device using a typical hot-gas bypass deicer. All of the devices cited are large-capacity refrigerant gas dehumidifiers. The refrigerant gas from the compressor cools an evaporator coil and when ambient air is passed by the coil, moisture condenses out and drips to a collector below. When operated over extended periods or in cooler temperatures, the evaporator tends to freeze over due to low flow rate of condensate. In this situation, the compressor is designed to switch over to hot-gas bypass mode. A thermostat and/or humidistat control assists in determining when the compressor switches over. This on/off cycle during cooler temperatures drastically reduces production of water until the compressor eventually stops when temperature of incoming air is too low.

SUMMARY OF THE INVENTION

For the present apparatus, it is critical to be able to operate for long periods without human adjustments. Rather than have the heat absorber cycle off/on and wait for the dew-forming surface to defrost when operating in cooler temperatures, a heat strip and additional fan are designed into the heat-absorber systems of the present apparatus.

When the dew-forming surface is about to start freezing, the air-heating strip is switched on and heat absorber 1 continues to run, and water production is not interrupted. As a further benefit, the incoming ambient air is warmed; generally, the warmer the ambient air, the more moisture that can be extracted from it. The heating strip also protects the apparatus, including collection reservoirs, from sudden unexpected freezing when ambient air drops below 0 deg. C.

The resistance-heating strip and fan, rather than a hot-gas bypass valve, distinguishes the present invention from the other devices.

The water generator of the present invention operates within a closed housing and water dispensing subsystems deliver directly to the external dispensing valve. It is not necessary to open the housing every time a small quantity of water is desired. The housing panels and various openings of the present invention are fitted with tight-sealing flanges to prevent insect infestation and environmental contamination of the water. Any dispenser that is designed to work in remote, harsh environments must be designed so that the outside envelope is infrequently opened and then only for maintenance. Each opening incident exposes the interior of the housing to infestation by all types of crawling and flying insects such as flies, mosquitoes and to entry of airborne contaminants such as blowing dust, etc. To make the present water generator-dispenser desirable for office or home use, the unit can be fitted with optional subsystems for producing water at three temperatures, i.e., hot, cold and ambient. This is accomplished by adding a secondary heat absorber source. Heat absorber-2 is placed under the bottom surface of the storage tank and an insulated, separator-baffle is added to the storage tank to separate ambient-temperature water from cold water. A cold-water-temperature sensor and switch assembly controls the operation of heat absorber-2 to maintain the predetermined temperature of the cold water zone, below the insulating baffle, at approx. 5° C.

To produce hot water, a heated, food-type stainless steel tank with an insulating jacket is added. The hot water tank is in fluid communication with the heated-fluid delivery control valve and the ambient temperature water in the storage tank. Water at a temperature of up to about 75° C. can be delivered from the heated fluid delivery control valve.

Also, an optional diverter valve may be installed to allow pumping into a container outside the housing. The water generator/dispenser of the present invention fills a long-felt need for emerging countries and indeed many places in the world. A physician familiar with United Nations hospital and clinic programs in Africa had particular praise for the present dispenser's potential to solve their peculiar problems when operating in extremely remote areas. Further, a product development organization has indicated a desire to produce the office and home models for the USA There is an immediate and critical need for the apparatus in many areas of the world, including USA The design synergism of the present invention is evident from commercial response to the concept.

The objects and advantages of the present invention are:

(a) providing a means for obtaining and dispensing potable water from an apparatus that is consistent with the decor of an office or home yet requires no permanent external plumbing or air duct, (b) providing an apparatus for heating and chilling potable water collected from the atmosphere, (c) providing an apparatus which can operate indoors or outdoors so as to be available to operate in remote areas, (d) providing an apparatus which can easily be assembled from sealed, ruggedized modules, (e) providing a wheeled-cabinet apparatus that is portable, i.e., can be rolled about on packed earth, pavement, bare floor or carpeted surfaces, (f) providing an apparatus which can be operated from low-voltage DC by attaching solar-electrical generating panels or by variable-frequency AC electrical power generated from wind-driven generators, (g) providing an apparatus that has minimal chance of water contamination due to volatile organic compounds, VOCs, insects or rodents, (h) providing an apparatus of simple, modular construction and designed for operation over extended periods without operator attention, (i) producing high-quality, purified water, by preparing the unit with medical-grade tubing and including an inert surface coating on the dew-forming surface, (j) producing liquid-water condensate at air temperatures just above freezing by use of an air-heating strip, (k) dispensing potable water at a convenient height for adults or children or persons in wheelchairs, (l) producing contaminant-free potable water while running unattended for extended periods of a month or more, (m) producing high-quality, potable water in varied environments such as offices, houses, or jungles.

(n) providing a water generator/dispenser which is easily portable both indoors and outdoors, (o) providing options for potable water at three different temperatures, ambient, approximately 5° C. and approximately 80° C.

(p) producing potable water near or below the cost per liter of bottled water, (q) producing high-quality potable water within latest ASHRAE and US federal standards for cooling and refrigerant apparatus, (r) providing a water generator/dispenser that can be easily transported by two adults using integral carrying handles, (s) providing a water generator/dispenser in which the exhausted air is filtered to remove dust, pollen, and airborne particles, (t) providing a water dispenser from which incoming air is charged with negative ions to facilitate particle separation, (u) providing a water generator/dispenser which will not produce or deliver condensate if either the air filter is removed or the subsystem for killing microorganisms fails, (v) providing a water generator/dispenser in which the electrostatic filter emits an audible whistle alarm when it needs cleaning.

Still further objects and advantages will become apparent from a consideration of the ensuing description and drawings.

BRIEF DESCRIPTION OF THE DRAWINGS

FIG. 3. is a diagrammatic rear view of the basic embodiment of the present invention.

FIG. 4. is a cut-away front view, with one vertical panel removed, showing diagrammatically the major components and subsystems of the basic embodiment of the present invention.

FIG. 6. is a cut-away front view depicting diagrammatically the interior (as viewed from the front) of a second alternative embodiment of the present invention showing the addition of components to collect 20 and dispense chilled water and ambient-temperature water.

FIG. 7. is a cut-away rear-diagrammatic view depicting the rear of the second alternative embodiment of the present invention which collects and dispenses potable water, showing the addition of components to produce and dispense chilled and ambient-temperature water.

FIG. 14 is a schematic view of an alternative embodiment of a cut-down water generator with side-type external reservoir and flow controls.

FIG. 15 is a schematic view of an an alternative embodiment of a cut-down water generator with overhead-type external reservoir and flow controls.

FIG. 18b is a schematic view of the potable water flow loop within the hybrid appliance shown in FIG. 18a.

DESCRIPTION OF THE PREFERRED EMBODIMENTS

Figure 1A:
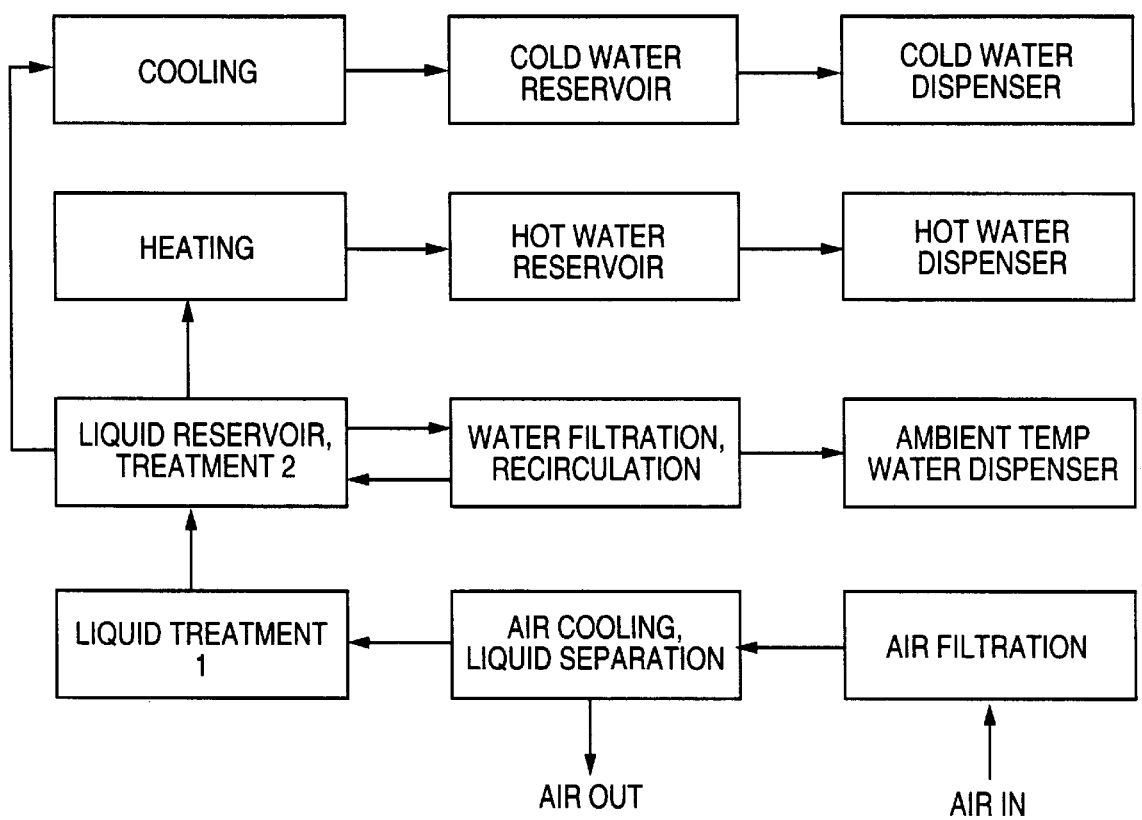
FIG. 1(a) is a block diagram showing the individual, functional components, sub-assemblies, controls, interlocks, alarms and interconnections which comprise the present invention and alternative embodiments which deliver cooled and/or heated water in addition to room-temperature water.
Figure 1B:
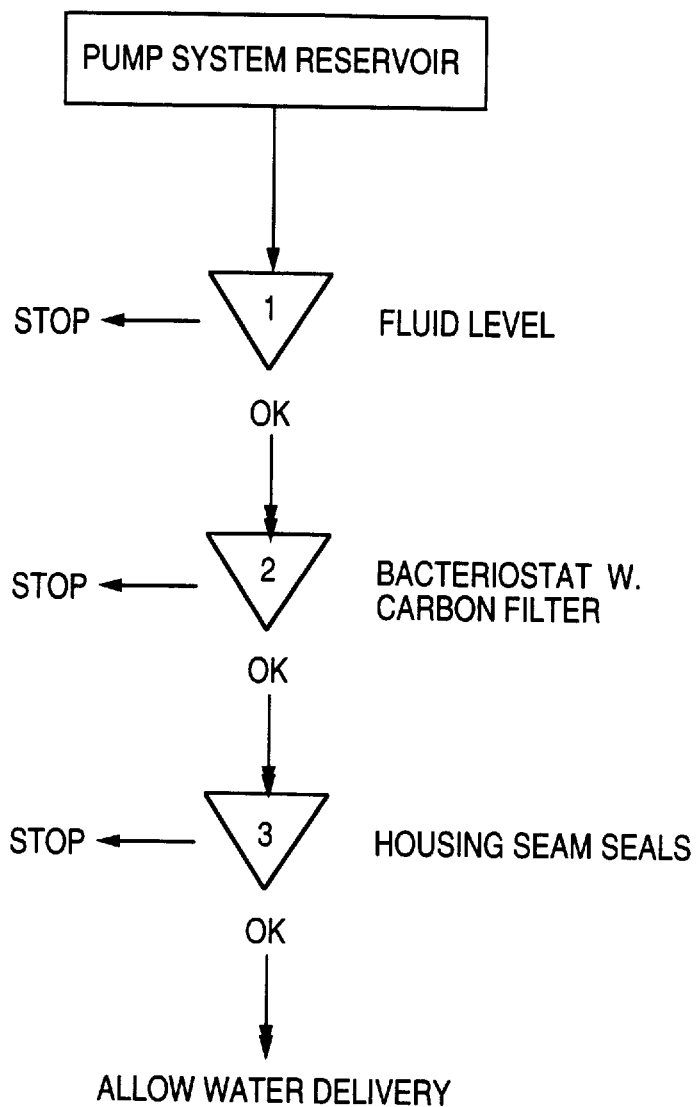
FIG. 1(b) is a schematic drawing showing the safety logic and functional interlocks to enable water delivery from the present invention.
Figure 1C:
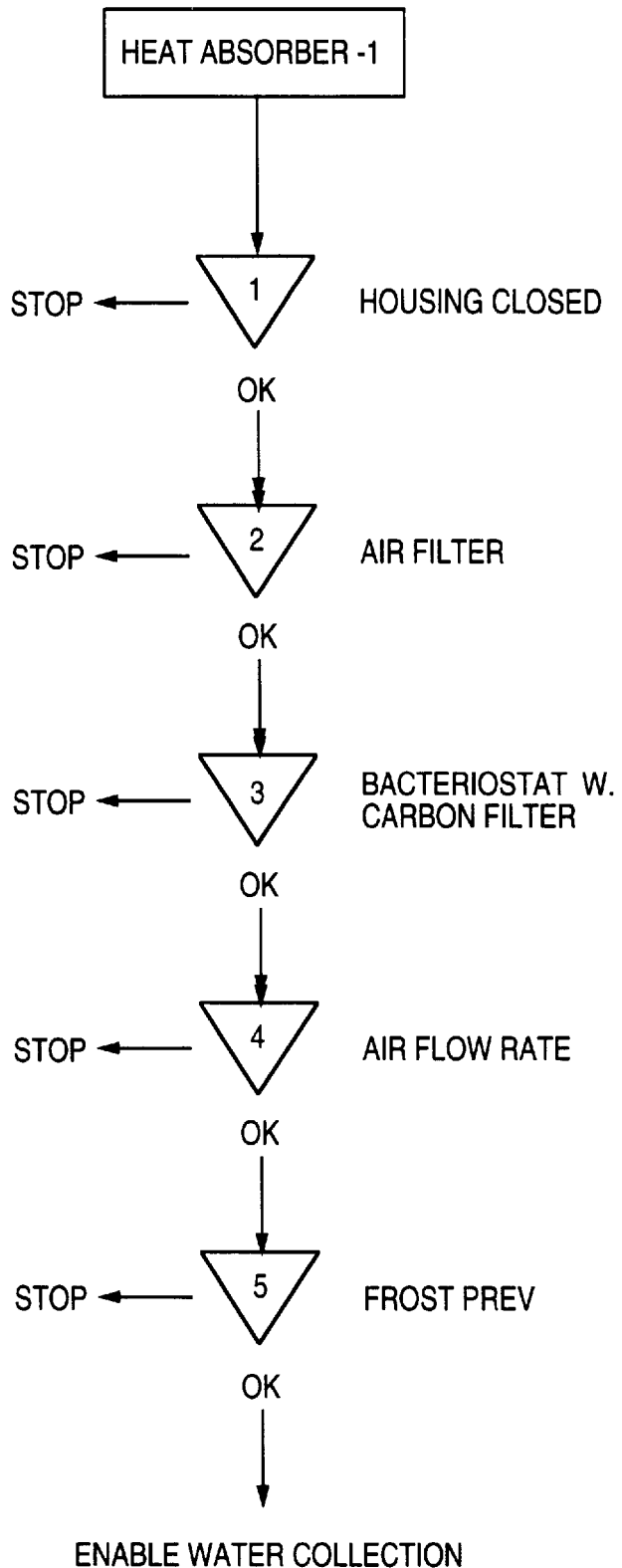
FIG. 1(c) is a schematic drawing showing the safety logic and functional interlocks to enable water collection by the present invention.
Figure 1D:
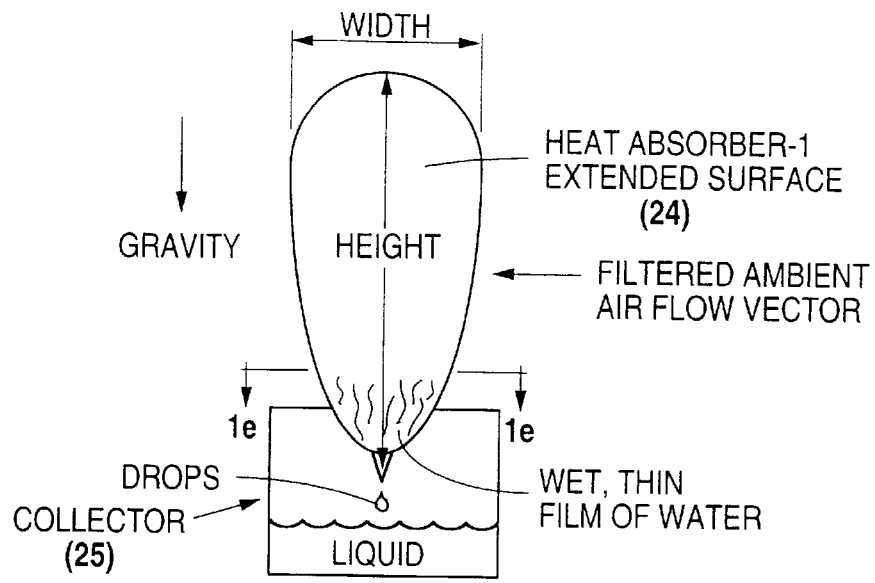
FIG. 1(d) is a vertical section view through heat absorber 1 showing the element-profile shape of the cooled heat-exchange surface, particularly the pointed drop guide for rapid draining of liquid dew from the lowest point.
Figure 1E:
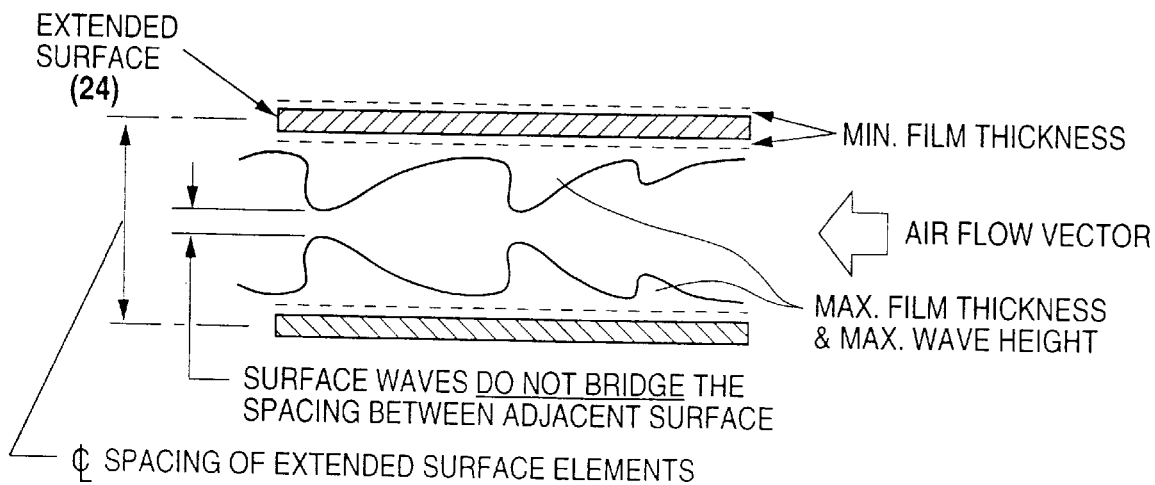
FIG. 1(e) is a horizontal section across two adjacent spaced-apart, vertical cooling elements showing the generally-horizontal air flow vector between the opposing surfaces and the thickness of minimum and maximum-thickness liquid-dew layers, especially the formation of surface waves due to momentum transfer from the air stream.
Figure 2:
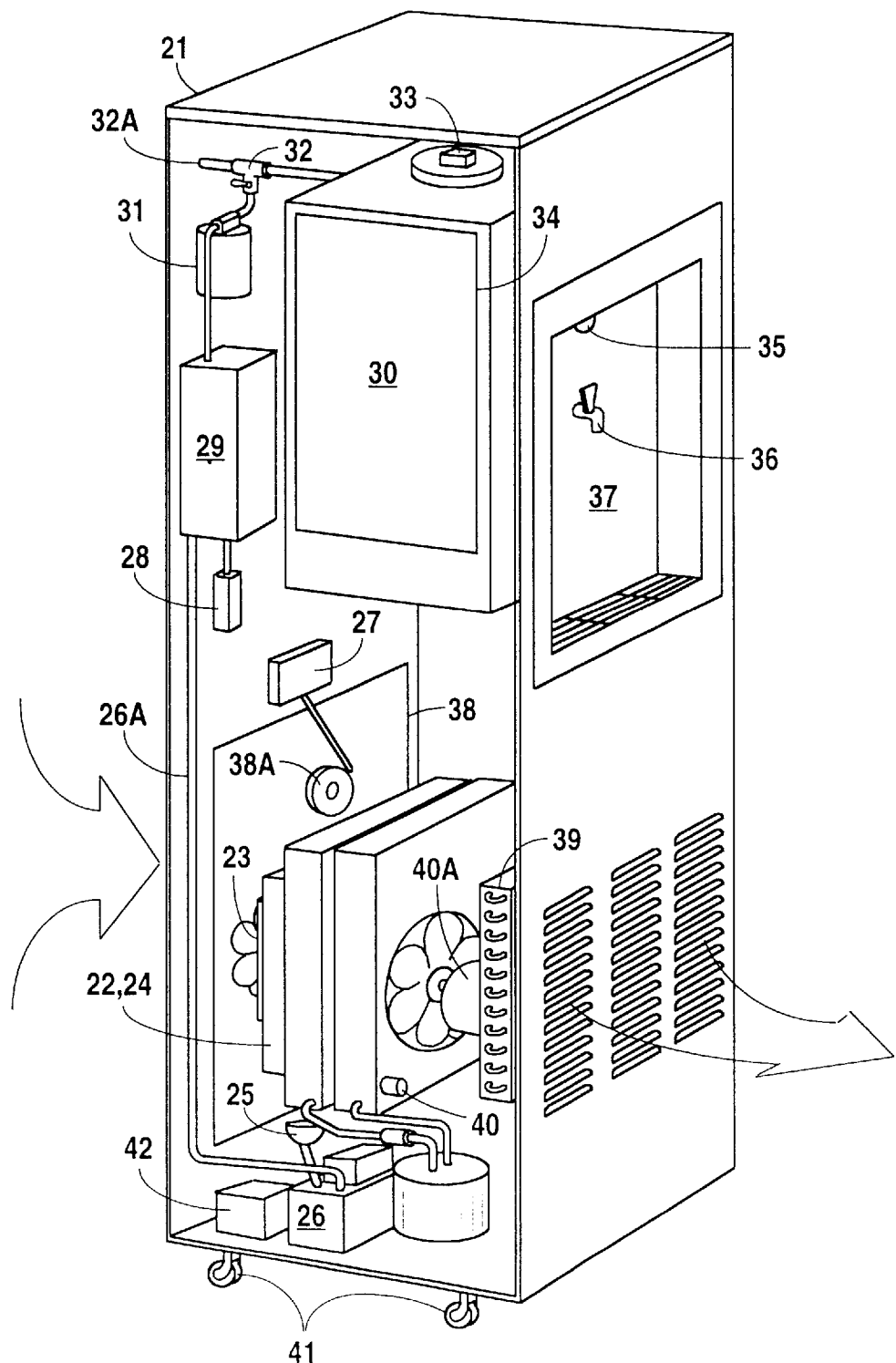
FIG. 2 is a cut-away perspective view, with one vertical panel removed, showing diagrammatically the front and left side of the basic embodiment of the present invention.

Table 1. includes a listing of all special and standard nomenclature used in this specification; the column headed "Indicia" shows the reference number of each feature or element and the column headed "Figure" indicates the figure where is feature or element is first shown. The water collection and treatment processes of the present invention are shown in FIGS. 1(a)–1(c). FIGS. 1(d) and 1(e) show design details of the dew-collecting surfaces of heat absorber 1. The general configuration of the basic water collection system is shown in FIGS. 2–4. The working components are enclosed in a housing (21) with a top cover, four vertical side panels and a base. The housing (21) incorporates a bracketed opening in the rear cover panel opening through which is inserted an electronic air filter (38). The air filter (38) contains a whistling, audible warning device (38-A) which signals when the air filter needs to be cleaned. An additional fail-safe switch (38-B) prevents operation of the system when the air filter (38) is not in place.

Figure 11:
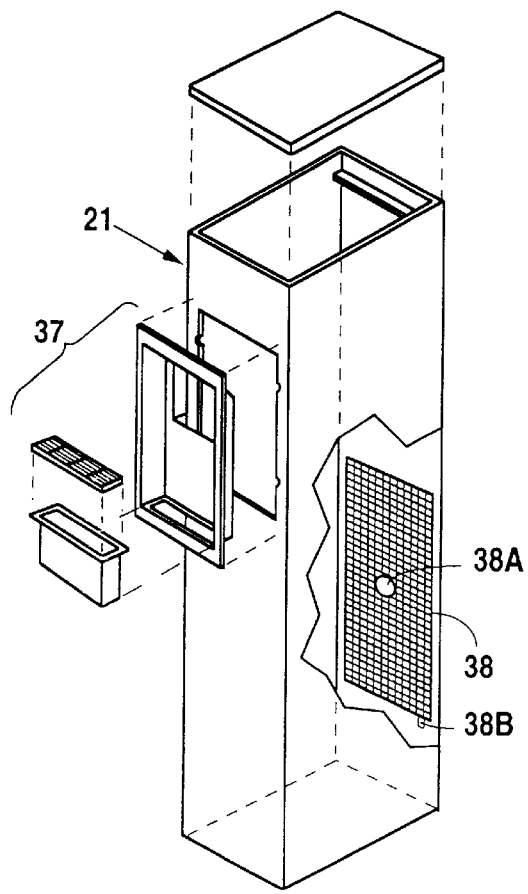
FIG. 11. is an exploded perspective view showing diagrammatically the front alcove assembly portion of the outside envelope of the basic embodiment of the present invention.
Figure 12:
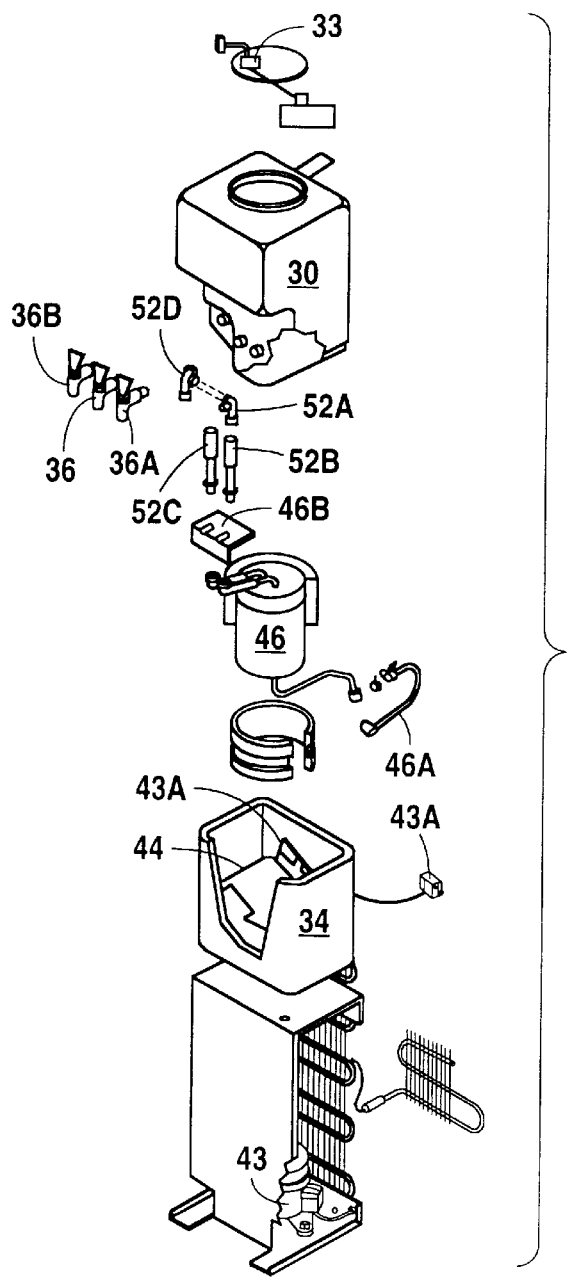
FIG. 12 is exploded perspective view showing diagrammatically the cold fluid tank, quick disconnects, heated fluid tank assembly, including connections, insulated jacket and the secondary heat absorber for an embodiment which collects and dispenses ambient, chilled and heated potable water.

The housing (21) incorporates a front wall alcove opening and assembly (37) which consists of an alcove shell, grid and waste water receptacle; see also FIG. 11 for an exploded detail Above the alcove is a low-light-level lamp, or "night light" (35). The alcove also contains a fluid delivery control (36) for dispensing ambient temperature water. The rear panel of the housing (21) has an inlet opening into the air filter (38) that includes a whistling alarm device (38-A). The front panel of the housing (21) provides an opening for air exhaust. This opening has an insect-resistant screen (49) on the interior of the housing (21) outlet port.

TABLE 1

Descriptive Nomenclature and Indicia

| Indicia | Description, function | FIG. |
|---|---|---|
| 21 | housing, case, cabinet | 2 |
| 22 | heat absorber-1 | 2 |
| 23 | strip heater | 2 |
| 24 | extended-area of fins | 2 |
| 25 | water, condensate collector | 2 |
| 26 | chamber, condensate pump assy | 2 |
| 26-A | transparent tube | 2 |
| 27 | air ionizer | 2 |
| 28 | UV lamp fall-safe switch | 2 |
| 28-A | UV lamp fall-safe alarm | 4 |
| 29 | UV bactericide lamp | 2 |
| 30 | water storage reservoir | 2 |
| 30-A | ambient-temp. water zone | 9 |
| 31 | water filter assy | 2 |
| 32 | diverter valve | 2 |
| 32-A | diverter valve outlet | 2 |
| 33 | storage reservoir float switch, lid | 2 |
| 34 | insulat. jacket, storage reservoir | 2 |
| 35 | night light | 2 |
| 36 | delivery valve, ambient temp wate | 2 |
| 36-A | delivery valve, cold water | 8 |
| 36-B | delivery valve, hot water | 8 |
| 37 | wall alcove assy | 2 |
| 38 | electrostatic filter | 2 |
| 38-A | whistle alarm | 2 |
| 38-B | fail-safe switch, filter | 2 |
| 39 | ozone generator | 2 |
| 40 | defrost sensor, heat absorber | 2 |
| 40-A | multi-speed intake fan assy. | 2 |
| 41 | casters, wheels | 2 |
| 42 | ultrasonic pest control device | 2 |
| 43-A | cold water temp sensor, switch | 6 |
| 44 | heat absorber 2, cold plate | 5 |
| 45 | floating, insulating separator | 5 |
| 46 | hot water tank assy | 9 |
| 46-A | hot water temp control, switch | 12 |
| 47 | dispenser, cups, cold, RT fluid | 6 |
| 47-A | dispenser, cups, hot fluid | 9 |
| 49 | insect screen | 3 |
| 50 | manual on-off control | 4 |
| 51 | multi-speed fan switch | 4 |
| 52 | quick-disconnect assy | 9 |
| 52-A | male quick-connect, ambient | 9 |
| 52-B | female quick-connect, ambient | 9 |
| 52-C | male quick-connect, hot water | 9 |
| 52-D | female quick-connect, hot water | 9 |
| 141 | external reservoir | 14 |
| 142 | seal plug | 14 |
| 143 | flexible external tube | 14 |
| 144 | vent w. barrier | 14 |
| 145 | manula valve | 14 |
| 146 | Low Volt. solenoid valve | 14 |
| 146-A | Low Volt. transformer | 14 |
| 147 | Low Volt. leads | 14 |
| 148 | flexible sheath | 14 |
| 149 | level sensor | 14 |
| 151 | counter force | 15 |
| 152 | mass sensor | 15 |
| 153 | pivoting support plate | 15 |
| 161 | seal adapter | 16 |
| 162 | level sensor | 16 |
| 163 | water tube | 16 |
| 164 | vent tube | 16 |

TABLE 1-continued

Descriptive Nomenclature and Indicia

| Indicia | Description, function | FIG. |
|---|---|---|
| 165 | flexible zone sheath | 16 |
| 171 | branching valve, interface | 17a |
| 172 | splitter valve, interface | 17a |
| 201 | UV radiation module | 18b |
| 202 | float switch, pump enable, level control, collector | 18b |
| 203 | "OR" valve, solenoid | 18b |
| 204 | icemaker | 18b |
| 205 | valve, icemaker branch, solenoid | 18b |
| 206 | valve, reservoir, pump enable, level control/reservoir | 18b |
| 207 | vent w. bacterial barrier | 18b |
| 208 | supply, pressure head | 18b |
| 209 | return, gravity head | 18b |
| 220 | refrigerant compressor | 18b |
| 221 | refrigerant condenser | 18b |
| 222 | "reciprocal AND" valve1 w. branch flow controls | 18b |
| 223 | "reciprocal AND" valve2 w. branch flow controls | 18b |
| 224 | refrigerant accumulator | 18b |
| 225 | freezer/icemaker evaporator | 18b |
| 226 | high-pressure refrigerator line | 18b |
| 227 | low-pressure refrigerator line | 18b |
| 230 | icemaker cabinet front elevation | 19a |
| 231 | ice-access door, right-hinged w. handle, left edge | 19a |
| 232 | exterior grip handles, left, right side panels | 19a |
| 233 | exterior potable water faucet(s) | 19a |
| 234 | holder/dispenser for disposable cups | 19a |
| 235 | air inlet w. grille, filter | 19a |
| 236 | supporting surface, floor | 19a |
| 240 | icemaker cabinet, front/interior | 19b |
| 241 | manual trim valve, recirculation flow cont. | 19b |
| 242 | water, pressure supply | 19b |
| 243 | water, pressure return, recirculation | 19b |
| 244 | water, pressurized reservoir | 19b |
| 246 | reservoir inlet check valve | 19b |
| 247 | flow control valve to icemaker, solenoid | 19b |

Operation of the apparatus is initially controlled by the manual on/off switch (50) located on the back side of the housing (21). The multi-speed fan control switch (51) is adjacent to the on/off switch (50) on the back of the housing (21).

Figure 13:
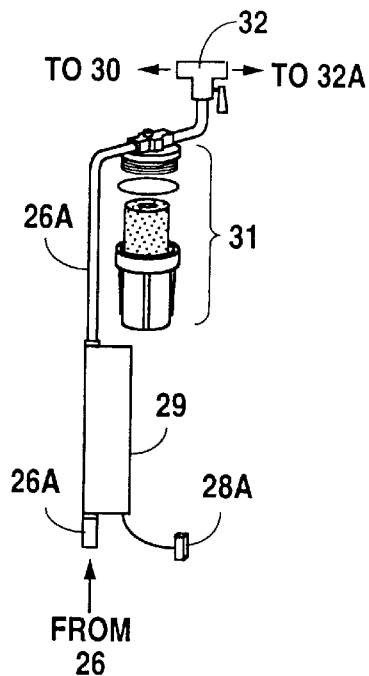
FIG. 13 is an exploded perspective view showing diagrammatically the details of bacteriostat, including the activated-carbon filter, for the basic embodiment of the present invention.

Air Flow and Treatment. Air entering the housing first passes through the replaceable air filter (38) and across the self-contained ionizing device (27). Air then is drawn past a heating strip and fan assembly (23), then across heat absorber-1 (22) and film-coated, dew-forming surfaces (24) by the multi-speed intake fan assembly (40-A), which is controlled by the multi-speed fan control switch (51). Liquid condensate flows by gravity into the enclosed sump (25) and pump system reservoir (26). The pump system (26) has a self-contained switch and liquid-level sensor which shuts off heat absorber-1 (22) when the reservoir is filled. From the pump reservoir, condensate flows through a section of tubing (26-A) and is recirculated through a bacteriostat subsystem ,i.e., a pump, carbon block filter (31) and a ultraviolet germicidal light for killing bacteria (29). This subsystem is controlled by a fail safe switch (28) connected to a fail-safe indicator light (28-A), as shown in more detail in FIG. 13. The bacteriostat indicator light (28-A) is located on the back panel of the housing (21).

As shown in FIG. 1(d), heat absorber-1 includes an array of extended-surface elements which are in good thermal connection with heat-sink contact zones at predetermined locations. The heat-sink points are mechanical-thermal connections adapted to remove heat from the extended surface and transfer it into an external environment. A variety of known heat-sink technics can be used to cool the extended surfaces, including classic boiling fluids contained in tubes, thermoelectric elements, and heat pipes. The heat-sink points are located at intervals of approx. 40–100 mm along the vertical center line of the extended area. The section profile of the bottom of the collector tray can be rectangular or half circle.

As shown in FIG. 1(e) the extended surface elements are generally parallel and spaced apart a predetermined distance to avoid bridging over of surface waves due to heavy or maximum condensate flows and high air-flow velocities. The minimal condensate film thickness is indicated by dashed lines; this thickness corresponds to the condition when the air heaters are activated and operating at maximum power to prevent icing over.

Water in the reservoir is recirculated through the bacteriostat subsystem, including the activated-carbon final filter system assembly (31). The final water filter is fitted with a replaceable activated-carbon adsorbent cartridge which is capable of removing organic contaminants and heavy-metal compounds. Processed water is then held in fluid reservoir-1, (30), which includes a form-fitted insulating jacket (34); through use of a diverter valve (32), processed water can also be delivered through a diverter valve outlet (32-A) to a large external collection container. The water level in the fluid tank (30) is controlled by the electrically-operated sensor switch and lid assembly (33), which causes the pump (26) to cease operation when the fluid tank (30) is filled.

Ambient temperature water is dispensed from a compartment within the fluid tank (30) via the ambient fluid delivery control (36). Disposable liquid containers, e.g., paper cups, suitable for cold water, are provided from attached dispenser (47) mounted on the side of the housing.

Fluid reservoir-1 (30) is removable from the housing for cleaning without removing its insulated jacket (34). This is accomplished by pulling aside the level sensor and lid assembly (33), which remains in the unit. The ambient fluid delivery control (36) remains affixed to the fluid tank (30). The fluid tank (30) can be cleaned using cleaning materials appropriate to its materials of construction and in accordance with public health requirements governing use of cleaning materials for food handling and potable water systems. By design of the present invention, mechanical removal of fluid reservoir-1 (30) is simple, and can be accomplished without disturbing the permanent tubing connections.

Additional and Optional Features. The housing (21) can be fitted with an ozone generator (39) adjacent to the departing air stream to further add to air quality. The housing (21) also contains an ultrasonic pest control device (42) which is operates continuously. To provide for mobility of the apparatus, four casters or rollers (41) suitable to the weight and size of the present invention are affixed to the four corners of the lower side of the base of the housing (21). Two handles suitable to the weight and size of the present invention are fixed, one on each side of the housing (21).

ALTERNATIVE EMBODIMENTS.

Figure 5:
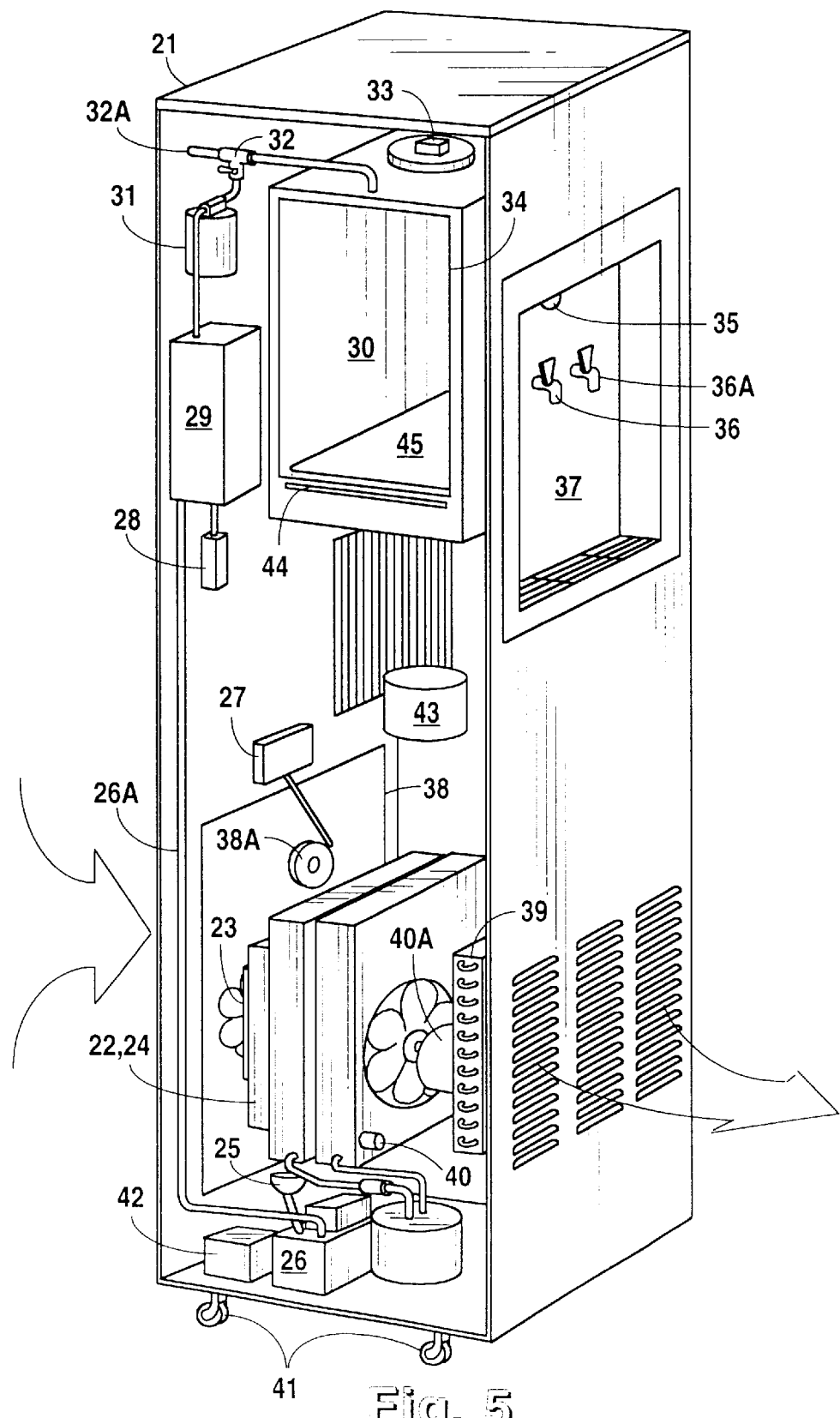
FIG. 5. is a cut-away perspective view, with one vertical panel removed, depicting a second, alternative embodiment of the present invention showing the addition of components to collect and dispense chilled water.
Figure 8:
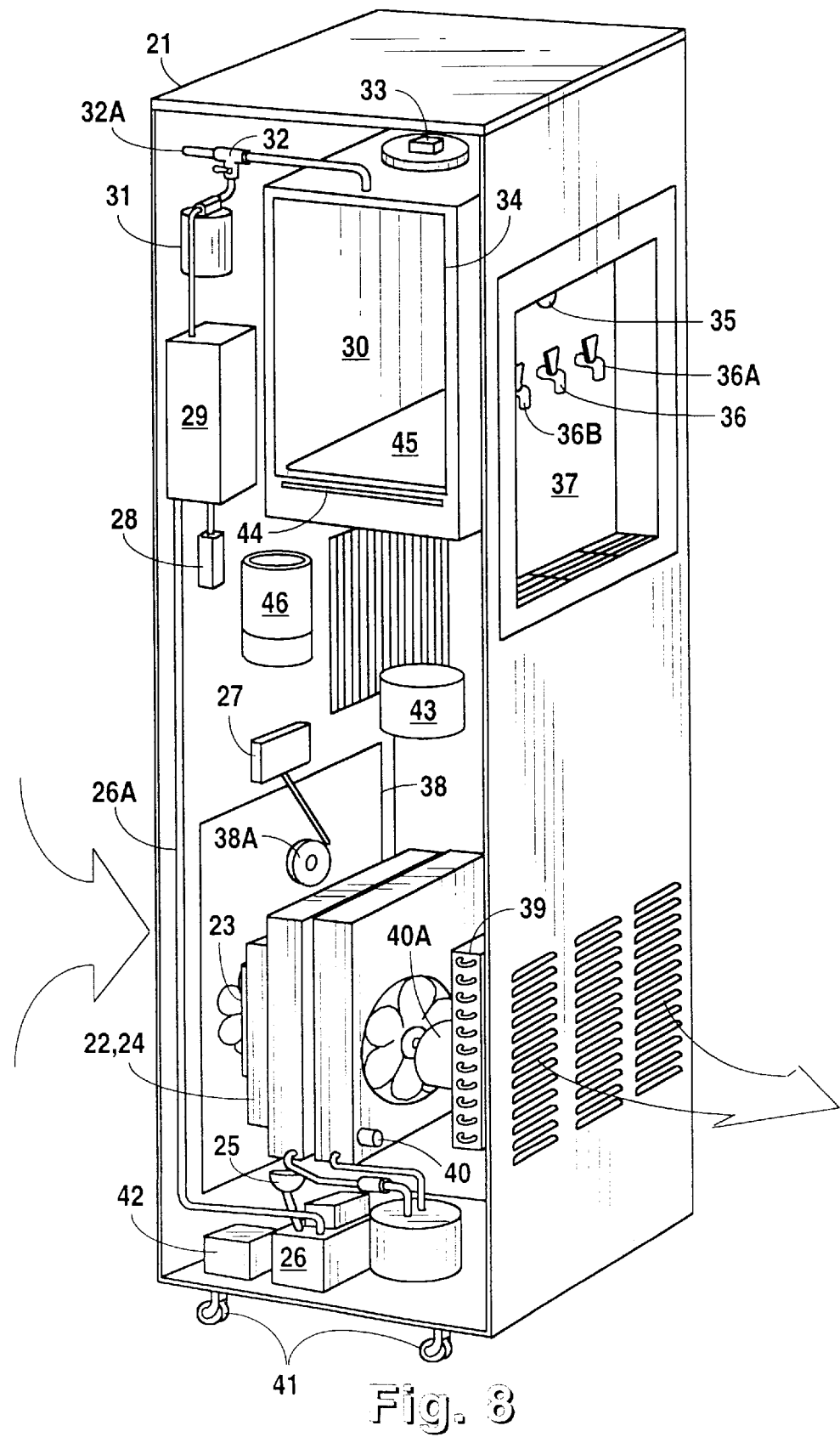
FIG. 8. is a cut-away perspective view showing a third embodiment of the present invention which prepares and dispenses potable water at three predetermined temperatures, i.e., ambient, chilled and heated.
Figure 9:
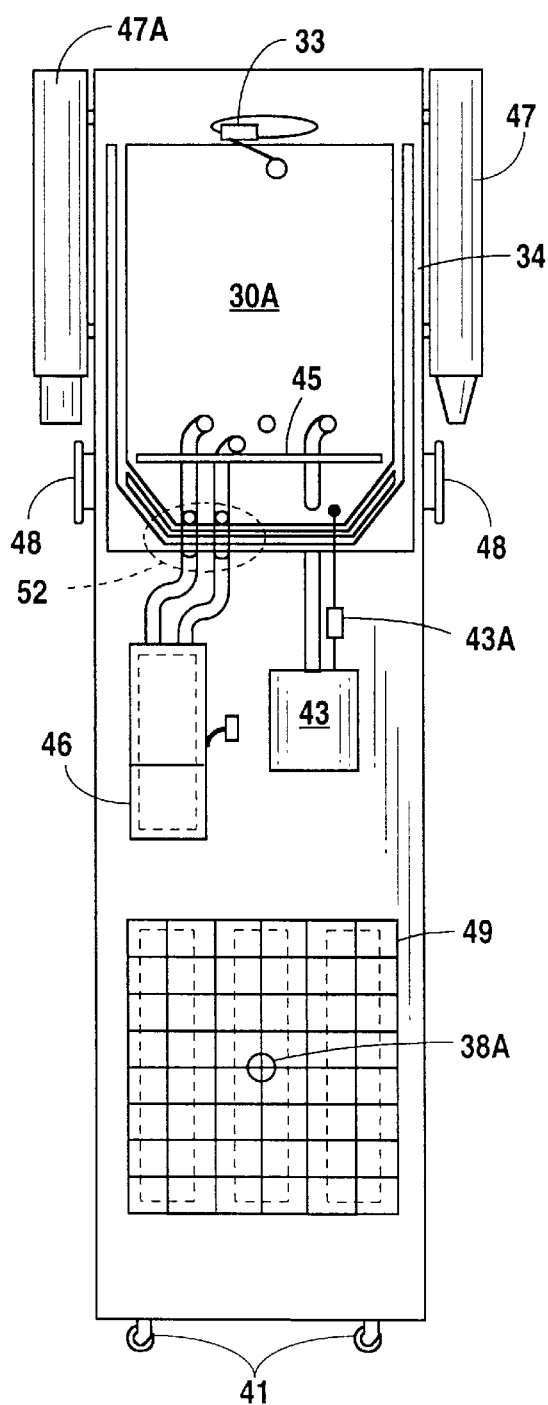
FIG. 9. is a cut-away rear view showing diagrammatically the interior of the third model of an apparatus that collects and dispenses potable water at ambient, chilled and heated temperatures.
Figure 10:
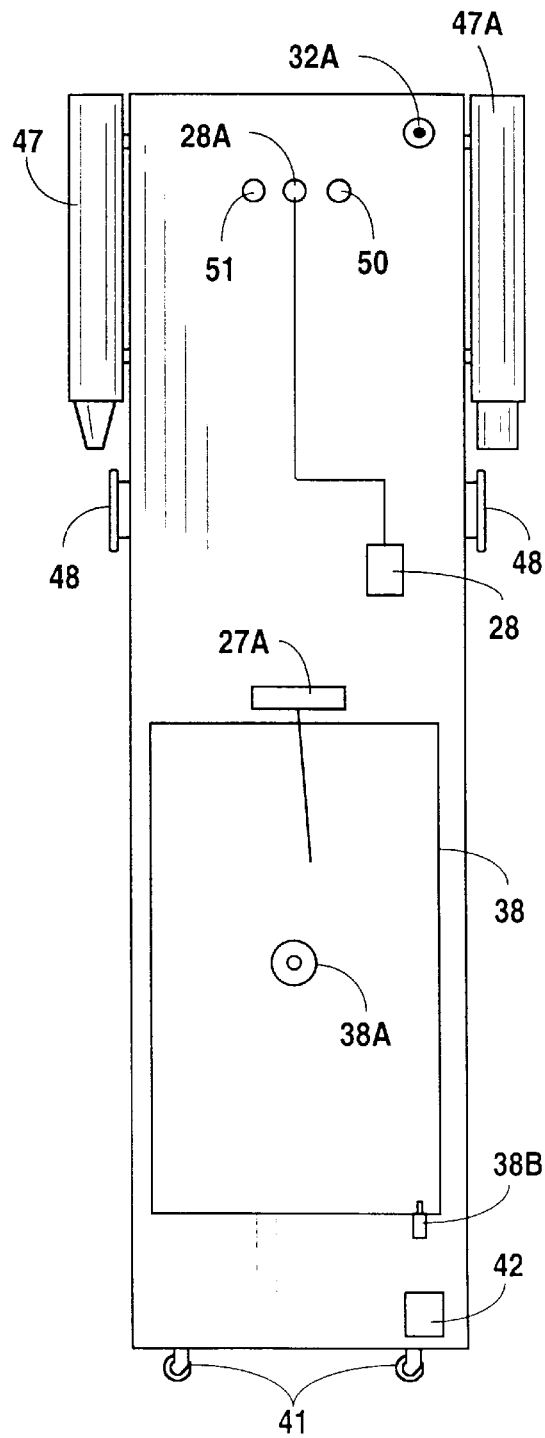
FIG. 10 is a cut-away front view showing diagrammatically the interior of the third model of an apparatus that collects and dispenses ambient, chilled and heated potable water.

Model 2. As shown in FIGS. 5–7, another embodiment of the present invention, Model 2, contains all elements of the basic model and also dispenses chilled water at a nominal temperature of 5° C. in addition to ambient temperature water. The chilled water is produced by incorporating a secondary heatsink, heat absorber-2, (43), which is controlled by the cold water temperature sensor and switch assembly (43-A). The heat-exchange probe (44) of heat absorber 2 is positioned between the insulation jacket (34) and the cold fluid tank (30A). An insulated baffle (45) is located in the cold fluid storage tank (30A) allowing for ambient water to be stored above the baffle and chilled water to be stored below the baffle. Chilled water is dispensed via the chilled fluid delivery control (36-A):

Model 3. As shown in FIGS. 8, 9 and 10 another embodiment of the present invention, Model 3, includes all of the elements of the basic model and Model 2, but also dispenses heated water at a nominal temperature of 75° C. Ambient-temperature water is supplied via a plumbing "tee" connection behind the ambient fluid delivery control (36) and connected to the hot water tank assembly (46) by means of a "quick" disconnect connection assembly (52), which is described below. The hot water tank assembly (46) includes a sealed stainless steel tank of the appropriate grade and type of stainless steel utilized for food handling, provided with an electric heater and insulating jacket (46). Temperature of the hot water is controlled by a heated water temperature control sensor and fuse assembly (46-A). A dispenser (47-A) for disposable liquid containers, suitable for hot water, is attached to the side of the housing. As described earlier, a quick-disconnect system (52) links the hot water tank (46) to the ambient fluid delivery control system by means of a "tee" connection. The same quick-disconnect system (52) links the heated fluid delivery control (36B) to the hot water tank assembly (46) to enable easy removal of the cold fluid tank (30) for cleaning, without the need for manual connections and disconnection of plumbing. As shown in FIG. 11, the quick-disconnect system (52) consists of a pair of receiver adapters, as follows: male adapter (52-A) connects with female receiver (52-B) to carry ambient temperature water into the hot water tank assembly (46). A male adapter (52-C) connects with female receiver (52-D) linking the hot water storage tank (46) with the heated fluid delivery control (36B). The tube divider (46-B) physically separates the adapter system tubing and connections. This quick-disconnect system allows for removal and reinstallation of the main water cold fluid tank (30) without manual interference with the refrigeration system, the water tubing or the hot water tank fittings.

OPERATION OF THIS INVENTION.

In this invention, heat absorber-1 (22) produces condensate on an inert-coated surface (24). This system is explained below. Incoming air is filtered by an electrostatic filter assembly, including the filter (38), a filter warning whistle (38-A) and the air-filter fail-safe switch (38-B).

An ionizer (27) puts a negative electrical charge onto particulate matter in the incoming air stream to assist in the trapping of particulates in the electrostatic filter. If desired for operation in a home or office, an optional ozone generator (39) can be included; this addition allows the present invention to function as a charged-particle generator and room-air purifier.

Condensate collected from the air flow across the extended area cooling surface (24) flows downward by gravity to a temporary collector for condensate (25) and is further conducted by gravity flow into a pumping reservoir assembly (26). In this assembly there is a self-contained float switch which actuates the condensate pump when a predetermined water level is reached. The condensate is conducted through UV-transparent tubing (26-A) prepared to comply with medical and human food-handling requirements. The condensate is subsequently exposed in multiple passes to a bacteriostat, or apparatus for killing bacteria, such as an ultraviolet germicidal light, (29). The bacteriostat (29) is monitored by the fail-safe switch (28). A fail-safe indicator light (28-A) on the exterior of the housing (21) confirms proper operation of the bacteriostat. If the bacteriostat is not enabled, as indicated by the light being "on", operation of the entire machine is stopped.

The condensate is pumped under positive pressure through an activated-carbon purification filter assembly, and then pumped into fluid tank (30), or (30A) for Model 2 or 3, made of plastic or stainless steel as is common for all food-service contact. The fluid tank is encased by a form-fitted insulation jacket (34) made of a nontoxic material, such as closed-cell polymer foam. A fluid delivery control (36) is installed into the storage fluid tank (30) using nontoxic sealants suitable for contact with potable water intended for human consumption. The fluid tank (30) is removable for cleaning. The fluid delivery controls (36, 36-A, 36-B) are at an ergonomically-correct level above the floor, making water easily accessible for children or persons in wheelchairs. A holder (47) for disposable cold-liquid containers is shown in close proximity to the fluid delivery controls (36).

A major improvement in the design of the present invention is the elimination of the standard deicing system and including in its place a heat strip and fan assembly (23). An electric-powered heating element and defrost sensor (40) senses when the heat-exchange surface of heat absorber-1 (24) is about to freeze over. Rather than turning off heat absorber-1 (22), as in typical old-art refrigeration systems, the temperature sensor (40) activates the heat strip and fan (23) which warms air passing over the cold surfaces (24) just enough to keep the accumulated liquid dew from freezing. The warmed air usually allows more moisture to be extracted from the incoming air flow.

Because the present invention can operate for long periods without human tending, a manually operated diverter valve (32) allows the potable water to be pumped to a remote cistern. Diverting the water flow does not disturb dispensing water from the storage cold fluid tank, provided that the tank contains water.

The cold and ambient fluid delivery control (36-A) and (36) extend from the fluid reservoir-1 (30) through the front of the housing (21) into a common dispensing alcove assembly (37) containing a grill-type drain insert to collect waste water. A night light (35) above the alcove provides illumination for water dispensing during periods of darkness or low light levels.

An ultrasonic pest control device (42) and extraordinary attention to sealing the housing (21) with nonporous, nontoxic sealants allows the present invention to operate for extended periods of a month or more indoors or outdoors without human tending.

Model 2 contains all subsystems which allow it to produce and dispense chilled water in addition to the ambient temperature water. The chilled water is dispensed at a nominal temperature of 5° C. Chilling of the collected purified water is accomplished is by adding a secondary cooling device, heat absorber-2 (43). The cooling surface (44) is positioned between the insulation jacket (34) and the bottom of the fluid reservoir-1 (30). To avoid cooling all of the liquid in the fluid reservoir-1, because this model also dispenses ambient temperature liquid, an insulated baffle (45) is placed in the fluid reservoir-1 (30A) allowing for ambient water to be stored above and cold water to be stored below. The cold water below the baffle is delivered through the cold-fluid delivery control (36-A); The ambient-temperature water is delivered through the ambient temperature fluid delivery control (36). Both fluid delivery controls protrude from the fluid reservoir-1 (30) through the front of the housing (21) into the dispensing alcove assembly (37).

Because the fluid reservoir-1 (30) is removable for cleaning without dismantling the internal mechanisms, the present design represents a significant improvement over old-art systems.

Model 3 of the present invention includes subsystems which permit it to produce and dispense heated water in addition to ambient-temperature water and chilled water. Heated water is dispensed at a nominal temperature of 75° C.

Heating of the water is accomplished by adding a heated water tank assembly (46) comprising a stainless steel tank in compliance with food-handling codes, a heater, an insulated jacket and a fused water-temperature control assembly (46-A). Ambient temperature water is drawn into the hot water tank through a quick-disconnect tee fitting behind the ambient temperature fluid delivery control (36). Hot water is dispensed through the hot fluid delivery control (36-B), which is connected to the hot water tank assembly (46). The quick-disconnect receiver-adapter assembly system (52) allows easy removal of the fluid reservoir-1 (30) for cleaning, without the need for manual connections and disconnections. The ambient temperature water portion of the assembly consists of a quick disconnect male adapter (52-A) that mates with the quick disconnect female receiver (52-B) to supply incoming water to the water heater tank (46). The heated water portion of the assembly consists of a quick disconnect male adapter (52-C) that mates with the quick disconnect female receiver adapter (52-D) to supply heated water to the hot fluid delivery control (36-B).

This unique disconnect concept represents a significant design improvement over old-art systems.

EXAMPLES

Examples M1 and M2 below give technical parameters for the design and inert surface coating of the extended heat-exchange area of heat absorber 1, i.e., the air cooling and dew-collecting surface.

Example M1

Extended heat exchange area. Incoming ambient air at a velocity of 1–10 meters/sec is cooled below its dew point by circulation across an array of generally-vertical, spaced-apart, cooled surfaces shaped and oriented to drain collected liquid dew dropwise from a pointed zone. The active extended cooling area for both sides of each element in the array is in the range 100–500 cm2; the total active area of the array is in the range of 1–4 m2. The general outline shape of the dew-forming elements is shown in FIG. 1(d). The height dimension of each cooling element is in the range of 15–40 cm; the element width dimension is in the range of 3–10 cm. The height dimension is measured generally parallel to the gravity vector; the width dimension is measured generally perpendicular to the gravity vector. Each element is formed from one or more sheets of high thermal conductivity material of thickness in the range 0.2–1.5 mm. The average center-line spacing of adjacent cooling elements is in the range 3–10 mm. For increased convective heat transfer, the profile may be either parallel-planar elements, as shown in FIG. 1(e) or parallel-corrugated elements. Parallel-corrugated elements may be prepared by 3D forming of planar elements to include an array of ridges and valleys arranged parallel to the vertical or at an acute angle in the range 1–15 deg. to the vertical. As shown in FIG. 1(e), surface waves formed on the maximum-thickness draining liquid condensate layer do not bridge across the element spacing. It has been found that dew-bridging results in liquid trapping and ice-blockage of the air-flow channels between elements. Heat absorption from the extended area can be accomplished by a variety of cooling means thermally connected to the area; such cooling methods include refrigerant-expansion coils, thermoelectric coolers, heat pipes, etc. The design of heat absorber 1 includes defining the number, size and placement of cooling conductors to cool the extended surface elements. In the case of cooling by a boiling liquid in contained tubes, the tubes are oriented generally horizontal and perpendicular to the extended surface plane. Several refrigerant tubes of 3–6 mm diameter spaced apart at a distance of 40–100 mm have been found to provide effective cooling. Extended surface elements may be formed from thermally-conductive metals, alloys, ceramics/glasses and polymer composites including Al, Al-alloys, Cu, Cu-alloys, Al-filled amide or olefin polymers and ceramics.

Example M2

Inert surface coating. To prevent chemical interaction of the dew condensate with the exposed cold surfaces of heat absorber 1, all such exposed, cooled surfaces are coated with a continuous, thin, inert, food-grade film of polymer such as siloxane, PTFE, urethane, olefin, etc. All exposed surfaces of the heat absorber which come into contact with liquid dew are cleaned to remove surface contaminants such as grease, oxides and other adventitious residues. An inert coating of thickness in the range 0.01–0.2 mm is then applied by methods such as spraying, dipping, electrostatic coating, etc.,. Post application, the film coating is cleaned to remove any volatile or extractable components which might contaminate the dew or water being produced.

Example M3

Air Filters, Alarms and Interlocks. The first line of defense against insect penetration into the unit are woven-wire screens covering the entire area of both the inlet and outlet air ports. The screen mesh openings range from 0.3 mm to approx. 1.0 mm in diameter. The depth and screen elements of the air filter apparatus are prepared and sized to achieve approx. 99.99% filtration of all solid particles of diameter greater than 1 micrometer for an air flow rate of 4–9 m3/min. The filter apparatus may also be fitted with a pressure-drop sensor which will permit buildup of collected particles of approx. 65% of the limit capacity of the element before an alarm condition is signaled; the optional filter-overload alarm may be an intense, high-frequency acoustic whistle.

The air filter may also be fitted with gas-ion generators, alpha- or beta-particle emitters, such as radioisotopes, electrostatic charging devices, such as agitated filament arrays or high-voltage corona wires, which facilitate retention of smaller, less-dense airborne particles. The air filter may also be fitted with an optional interlock switch which prevents operation of the entire generator if the element is incorrectly positioned or an incorrect size is used.

Bacteriostat System and Interlocks. The bacteriostat system includes two stages: (a) an active killing stage for microorganisms and (b) an activated-carbon adsorption stage for removing undesirable and toxic organic impurities which are present as vapors in the ambient air and will be dissolved in the condensate water produced. The killing stage can employ electromagnetic radiation, such as UV or gamma, of selected intensity and wavelength, to kill adventitious bacteria and viruses which are present in the condensate water. Alternatively, the killing stage may employ one or more physiologically-tolerated oxidizing chemical species such as ozone or hydrogen peroxide for killing bacteria. It is, of course, important to provide an exposure chamber which allows the condensate water to be exposed to or circulated through the killing zone. Either the UV source or the chemical generator may be fitted with positive interlocks which shut down the delivery pump if the device is not operating within control ranges of wavelength, intensity or sterilization-agent dispensing rate.

Example M4

UV germicidal lamps. The simplest killing stage includes a high-intensity, short wavelength ultraviolet lamp, UV sterilizing device, and fusible link interlock with the recirculation pump. Should the UV lamp fail to operate at an effective wavelength and intensity, electrical interlocks prevent the circulation pump from operating; in this event, no water can be delivered from the generator. The UV generator can be: (a) mounted into the cover of the reservoir for direct exposure or (b) mounted adjacent to a section of low-pressure tubing which transmits the effective radiation wavelengths through the water. In addition to quartz, known UV-transmitting glasses, polymers or ceramics may be used for the UV-lucent tube zone. The treatment zone or chamber must also be fitted with UV reflectors to maintain a high intensity level of the effective wavelengths and prevent accidental UV exposure during maintenance work. For the UV lamp, the GE model T5 has been found to give good results. Several other types of UV sources can be adapted to operate with the present invention; these include electronic solid-state UV devices, natural sunlight light pipes, and fluorescent/chemiluminescent sources.

Alternative Ozone or Ultrasonic Water Treatments. As an alternative to the UV sterilization device, an ozone generator or an intense ultrasonic field may also be used for water sterilization. The ozone systems operate by electrochemical formation of microbubbles of O3 in the condensate water. Known piezoelectric or magnetostrictive ultrasonic probes can be fitted to a section of tubing or mounted to immerse the probe into the reservoir tank.

Example M5

Ozone Gas Generators for Air Freshening. Gaseous ozone is thought to assist in removal of undesirable vapors and aerosols from the ambient air. An optional ozone generator can be mounted in the air-handling section of the present invention. Several alternative ozone generators have been evaluated for conditioning the air being circulated through and discharged from the present water generator; the most cost-effective seems to be the Bora model from Alpine Ind. Alternatively, other electrochemical generators can be used to generate or release sterilizing gases; one example is the release of halogen gases based upon metered injection of compounds which decompose spontaneously or which can be electrochemically dissociated in liquid solution.

Example M6

Air Ionization Pre-Treatment. Electrostatic charged-particle generators of various types such as polonium strips and Sanyo HAP 3000 ion generators have been evaluated and found to work well with the present air filter for removing aerosol particulate contaminants. Charged particles emitted from the generator impart a charge to the particles which makes them easier to filter. Such modules are connected to the main controls with a fail safe circuit to prevent operation if the ionizer is not operating within control limits. Alternative embodiments of the present invention using other sources of charged particles including alpha particles, beta particles, and charged ions may be used. For example, isotope mixtures and/or decomposition-result alloys of radioactive metals such as radium and polonium are useful charged-particle sources; since such emitters can be made with controlled particle fluxes, small area sources are also possible.

Example M7

Activated Carbon Block Filter. The simplest and least expensive adsorber for volatile organic compounds, VOCs, includes a porous activated-carbon block filter; such a filter is connected in series with the UV sterilization device. At a flow of 0.8 to 2 liter/min, the cartridge is capable of trapping 1–2 micrometer diameter suspended particles, removing taste and color bodies and reducing dissolved toxic hydrocarbons to acceptable levels for safe drinking water. Should this filter become substantially blocked, the power to the recirculating pump will be interrupted. Water is continuously recirculated through the UV and activated carbon units when the generator is "on". Carbon filters such as the Amtek C240 MMB have been used for the activated carbon VOC filtration. In regular operation, no water which has not been passed repeatedly through both can be delivered from any output valve, including, cold, ambient, hot and the diverter valves.

Example M8

Alternative working fluids in compression refrigerator cooler for heat absorber-1. Approved working fluids for high-efficiency reverse-cycle equipment fall into two main classes: high temperature and low temperature. So-called low-temperature refrigerant fluids, such as 406A operate at lower temperatures and lower pressures; use of such fluids can be significant for units operating in air-conditioned spaces.

Example M9

Alternative heat sinks for units operating in air-conditioned spaces. For esthetic reasons it may be desirable to reject heat into: (a) the frame or surface skin of the enclosure or (b) the liquid condensate water collected below heat absorber-1. When a mechanical refrigeration system is used for heat-absorber-1, it is also possible to provide a thermal/mechanical linkage from a portion of it's evaporator section and it's condenser, for the purpose of modulating the temperature of the exhausted air. In this embodiment, it is possible to use a lower flow rate of cooling air and thereby reduce the level of fan noise which is projected into the local environment.

Example M10

Alternative controls for units used in air-conditioned spaces. The resistance-heating strip deicer for units used outdoors can be replaced by thermostat/humidistat controls. This option is of interest for units used in a controlled environment.

Example M11

Instead of the internal reservoir for holding water to be dispensed, it is possible to use an external reservoir such as a 20-liter glass bottle or other container. The system dispensing controls for such an embodiment would be modified to connect with an appropriate ancillary liquid level or fluid-mass sensor for the external container to regulate water generation when the container is filled to capacity.

Example - M11A

Ancillary external reservoir. Version M11A, shown in FIG. 14, is an embodiment with no internal reservoir and a large-volume, covered vessel located on the floor beside the unit. This embodiment is a "cut-off" version of the simple embodiment shown in FIG. 2 wherein the housing is truncated by a horizontal plane at the vertical height of the bottom of the alcove assembly, approx 0.8 to 1.5 m above the base plane. The water output flow from the water generator is regulated by a solenoid valve (146) which is in turn controlled by a liquid level sensor (149) which is attached to the seal plug (142). The sensor and solenoid valve may be known low-voltage electric devices designed and certified for safe immersion in water or use in wet environments; alternatively the sensor and slave valve may be simple known fluid/mechanical devices. For ease of use, it is envisioned that the flexible external tube (143) and flexible low-voltage leads (147) may be enclosed in a flexible sheath (148) or tied together with known bands and methods. Although the external reservoir (141) is shown here as a vertical bottle standing closeby on the base plane and fitted with a tight-fit removable seal plug (142) adapted to prevent entry of liquids or gases from the exterior into the inlet port of the reservoir, it would also be possible to locate it at some distance 2–10 m at the same level, e.g., in another room or building. It would also be possible to locate it above or below the base-plane level, up to approx. 5 m level difference, by the addition of known precautions such as non-siphon check valves. Although the embodiment shown in FIG. 14 shows electrical/electronic sensors (149) and control valves (146), it is also possible to use magnetic, optical, acoustic, or mechanical level sensors and related water-flow control valves. Although the external-line valve (145) is shown as a simple manual valve, it is also possible to use an auto interlock device to detect: (a) whether the external reservoir is correctly connected, (b) whether the unit is powered, or (c) whether the water-generation switch is "on".

Example M11-B

External/overhead storage bottle weighing. Version M11B, shown in FIG. 15, is an embodiment with no internal reservoir and an adjustable weight or mass-sensing device mounted on its top surface, which supports an external vessel. The top surface is a "cut-off" embodiment similar to that shown in FIG. 14. The mass-sensing element serves to shut off the solenoid valve when the container it supports is filled to capacity. By adjusting the zero point and sensitivity of the mass-sensor, containers of differing empty weights and internal capacity can be used, i.e., 4-liter, 8-liter, 20-liter. The external container is placed on a weighing plate (153) secured to the top surface of the truncated housing. The pivoting weighing plate shown in FIG. 15 is subject to the downward load of the reservoir and its contents and to counterforces (151) which keep the weighing plate approx. level, i.e., at an angle of less than 5 deg. Alternative support embodiments for a non-pivoting weighing plate would include arrays of 1–10 compliant elastomer elements or spring elements. Further, the counterforce (151) can be applied at a plurality of points to support the weighing plate (153), ie., the counterforce could be provided by 1–10 resilient elements of differing or variable characteristics to allow for use of containers of different sizes or tare weights. The simple flat plate (153) shown in FIG. 15 can be replaced by a shaped weighing platform having an engagement or retention zone for the bottom of the reservoir, e.g., a recess or pocket, an array of projections, a tie down strap, or snap-in anchor latches for an externally-grooved reservoir. The electronic weighing sensor (152) shown in FIG. 15 is connected by low-voltage leads to the solenoid valve (154); when the container is filled to capacity, its total weight reaches the predetermined value built into the counterforce (151) and the weighing plate triggers the sensor (152). It is also possible that the signals from sensor (152) can provide valuable control outputs to regulate the operation of the water generator, i.e., if the reservoir contains at least a predetermined quantity of water and the time of day falls in the period 1700 to 0600, the logical management algorithm could be programmed to defer operation of the generator. The manual water flow control valve shown in FIG. 15 can also be replaced by a solenoid and electrical/electronic sensors to detect: (a) whether the external reservoir is correctly connected, (b) whether the unit is powered, or (c) whether the water-generation switch is "on".

Example M11-C

Figure 16:
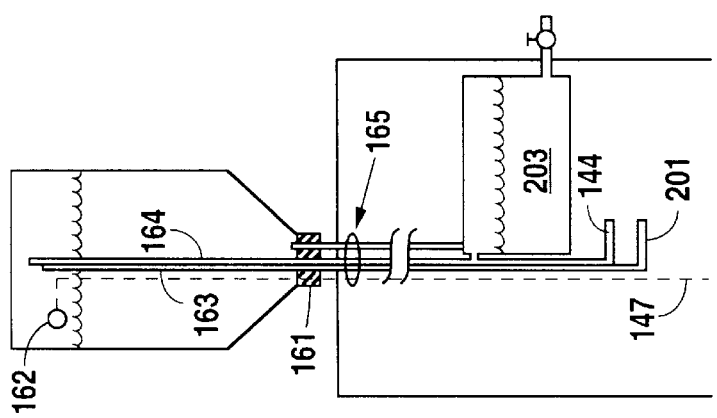
FIG. 16 is a schematic view of a retrofitted typical bottled-water dispenser attached to a cut-down water generator positioned along side and connected to supply potable water into existing unit. Components to retrofit typical existing bottled-water dispenser units can be provided as a model-type unique kit or a universal kit.

Retrofit kit for typical bottled-water dispensers. Version M11C, shown in FIG. 16 is a retrofit embodiment which can be installed to modify a typical gravity dispenser as commonly used for standard bottled water. Such dispensers can be easily converted to use water generated by the present invention by installing a vertical water delivery tube to the rubber seal collar; this tube is fitted with integral water level sensor located at the uppermost end. For such cases, the water generator with a reduced-volume internal reservoir would be located adjacent to or beneath the existing water dispenser. It is envisioned that a vertical, water-delivery tube of appropriate material for potable water, will be installed as a modification of the existing bottled-water dispenser. The length of the vertical tube and the specific position of the water-level sensor can both be adjusted to accommodate different sizes of supply bottles and different seal collar designs. The water level sensor serves to shut off the solenoid valve of the water generator when the water bottle on the dispenser is filled to capacity. The sensor and solenoid valve may be low-voltage electric devices designed for immersion in water or wet environments; alternatively the sensor and solenoid valve may be simple fluid/mechanical devices. As shown in FIG. 16, the level sensor (162) is installed at the uppermost end of the water inlet tube (163) and the air-vent tube (164). The mod. kit also can also include a seal adapter plug (161) if the existing collar does not lend itself to retrofit. For the possible cases in which the existing collar and piping are extremely difficult to connect, the retrofit kit can include an embodiment with flexible connections between the existing system and the new seal adapter (161). The flexible zone and sheath (165) consists of sheathed, flexible connections to the level sensor (162), vent tube (164) and water tube (163). To anticipate the case wherein it is desired to use an already-retrofitted bottled-water dispenser with either the water generator or purchased supply bottles, one embodiment of the conversion kit can be provided with a lengthened flexible zone. This will permit insertion of the seal adapter (161) along with the elongated tubes (163), (164) into a typical filled supply jug held with its mouth facing upward beside a typical cabinet, the length of the flexible zone is in the range 0.2 to 1 m. When the jug is lifted into position on the cabinet, the excess length can be concealed inside the typical cabinet. When the level sensor (162) detects that the jug is filled to a predetermined level, it sends a signal back to the solenoid control valve of the water generator through the low-voltage leads; this signal would cut off the flow of water into inlet of the water tube (163). It is envisioned that a "cut-off" embodiment of the present water generator similar to that shown in FIG. 14 would be placed beside the existing bottled-water dispenser.

Example M12

Water generator for use in vehicles subject to violent motions and tilt angles. Since recreational vehicles and seagoing vessels may need an emergency source of drinking water, it is of interest to provide an embodiment of the present invention which is tolerant during operation of tilts up to 30 degrees in combination with movements which generate centrifugal forces in opposition to normal gravitational forces. It is envisioned that the present invention could be fitted with two changes to meet these needs: (a) gimbal-suspended, sealed condensate collector and (b) enclosed, sealed potable water reservoir with an appropriate vent.

Example M13

Combination refrigerator and water generator. Since the present invention uses certain systems which are already present in a typical household refrigerator, a further embodiment of the water generator is to incorporate it with the cooling and auto icemaking subsystems of a refrigerator to produce a hybrid appliance which both cools food and generates its own mineral-free potable water for dispensing directly as icewater or for automatic preparation of mineral-free ice cubes. It is envisioned that at least three approaches to these alternative embodiments are possible: (a) to incorporate or integrate the water generator of the present invention with such appliances during original manufacture, (b) attach an embodiment of the water generator of the present invention as a field-modification to such units using permanent couplings/mountings/manifolds attached to prepared electronic and fluid interfaces installed at original manufacture, or (c) connect the water generator of the present invention with the cooling systems of such units using a modification kit including permanent or quick-disconnect fittings/mountings. The difference between approach (b) and approach (c) is that the fluid fittings and electrical circuits from the modification kit would be attached at predefined points, but not to factory-installed fittings or interfaces, to existing systems of the appliance; it is anticipated that approach (c) could be done "on site" or in a repair shop.

Figure 17B:
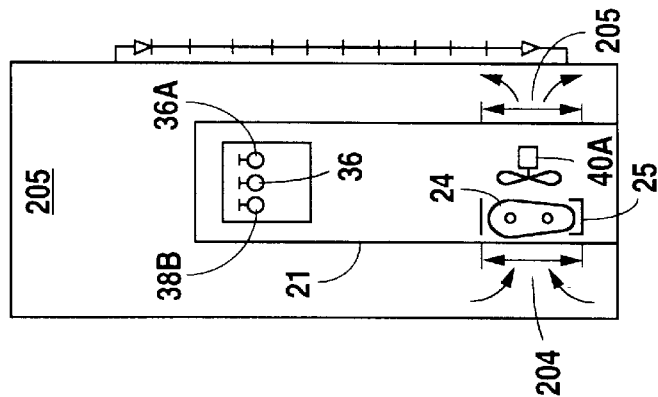
FIG. 17b is a schematic side view showing common refrigerant-fluid connections and circulation between a typical refrigeration-type appliance and a hybrid or combination embodiment of the present water generator.
Figure 17A:
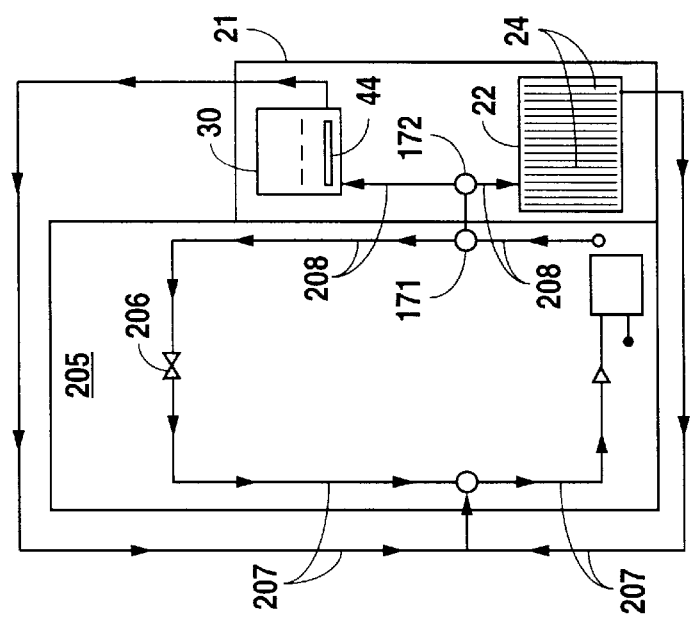
FIG. 17a is a schematic front view of showing common refrigerant-fluid connections and circulation between a typical refrigeration-type appliance and a hybrid or combination embodiment of the present water generator.

FIGS. 17a and 17b show front and side views respectively of one possible embodiment of the present invention as integrated with a vapor-compression refrigeration-type appliance such as a refrigerator-freezer, icemaker, room air conditioner or a local air-handler. These figures show the outlines of the enclosure of a typical refrigeration-type appliance, and the flow diagram for the liquid and vapor refrigerant through the compressor, expansion valve and condenser. One embodiment of the present water generator is also shown as an integrated sub-system including indicia for its key elements as they can be placed in this embodiment. For this illustrative embodiment, the water generator is shown on the right side of the main appliance; air from the space is drawn into the front of the water generator portion and exhausted toward the rear. While the alcove (37) and delivery valves (36), (36A), (36B) are shown facing toward the right in this example, they could also face toward the front of the main appliance. In this example configuration, the main compressor and main condenser carry the extra cooling load imposed by operation of the water generator, and its water cooler. The integrated water generator section would need only heat absorber-1 (22) and heat absorber-2 (44) for its cooling requirements; both these would draw liquid refrigerant from the main system. FIG. 17a shows phantom views of the reservoir (30), heat absorber-2 (44) and heat absorber-1 (22); the extended-area fins are shown in a cut-away view with a portion of the water-generator housing front-wall removed. The branching valve (171) would be included in the integral interface and installed during manufacture of the main appliance; the attached or integrated water generator system would be fitted with a mating interface and splitter valve (171) which would divide the liquid flow from (171) between heat absorbers-1 and -2 of the water generator. As shown in FIG. 17b, the extended-area fins of heat absorber-1 are shown in cut-away view with a portion of the water-generator housing sidewall removed. As can be seen, the fins are arranged as a parallel stack with their flat faces parallel to the side face of the main appliance. The water condensate collector is shown schematically as (25); the intake fan and motor to circulate room air across the cooled surfaces of heat absorber-1 are indicated as (40A). Essential systems of the water generator as described herein are enclosed within the housing (21); optional and other ancillary systems described can also be included within the enclosure (21). Further, it is possible for such integrated water generators, to use housings of smaller size and different shapes/proportions as needed to assure high efficiency and consumer acceptance of the combined or hybrid appliances.

Example M14

Combination water generator with: ice makers, air conditioners and dehumidifiers. Since the water generator of the present invention uses certain systems which are already present in typical ice makers, air conditioners and dehumidifiers, it is cost-effective to add a certain level of marginal capacity in their cooling systems, generate potable water and provide it at one or more selected temperatures by means of permanent or quick-disconnect fittings/mountings. It is envisioned that at least three approaches to these alternative embodiments are possible: (a) to incorporate or integrate the water generator of the present invention with such appliances during original manufacture, (b) attach an embodiment of the water generator of the present invention as a field-modification to such units using permanent couplings/mountings/manifolds attached to prepared electronic and fluid interfaces installed at original manufacture, or (c) connect the water generator of the present invention with the cooling systems of such units using a modification kit including permanent or quick-disconnect fittings/mountings. The difference between approach (b) and approach (c) is that the fluid fittings and electrical circuits from the modification kit would be attached at predefined points to existing systems of the appliance; it is anticipated that approach (c) could be done "on site" or in a repair shop. The resulting hybrid appliance would be capable of generating potable water which is compliant with NSF-53 purity standards as well as performing its normal function. In a temperate climate, disposal of water condensate from such units (dehumidifiers, air conditioners) requires special drain piping and provision for manual emptying of the collector.

Example M15

Evaporative-cooled spaces. In an arid climate, the water generator of the present invention can be placed near a pool or other body of water or in an interior space which is cooled by water-evaporation air conditioning equipment for reliable production of high-purity potable water.

Example M16

Figure 18A:
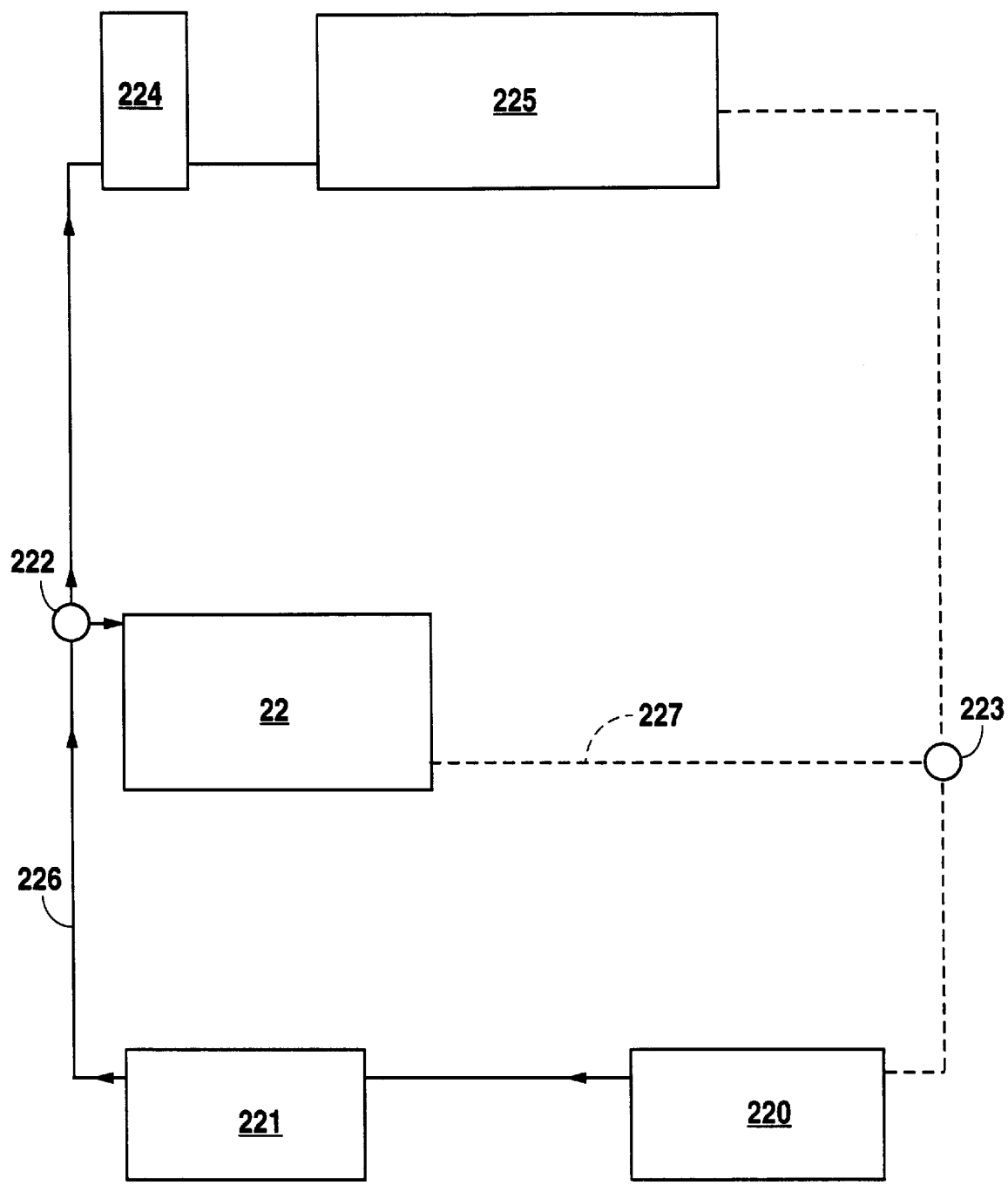
FIG. 18a is a schematic view of the refrigerant flow loop within a hybrid appliance which has the following functions: refrigerator/freezer, automatic icemaker, potable water dispenser and water generator according to the present invention. This appliance generates its own water for making ice and dispensing by condensation of water vapor from room air.
Figure 18B:
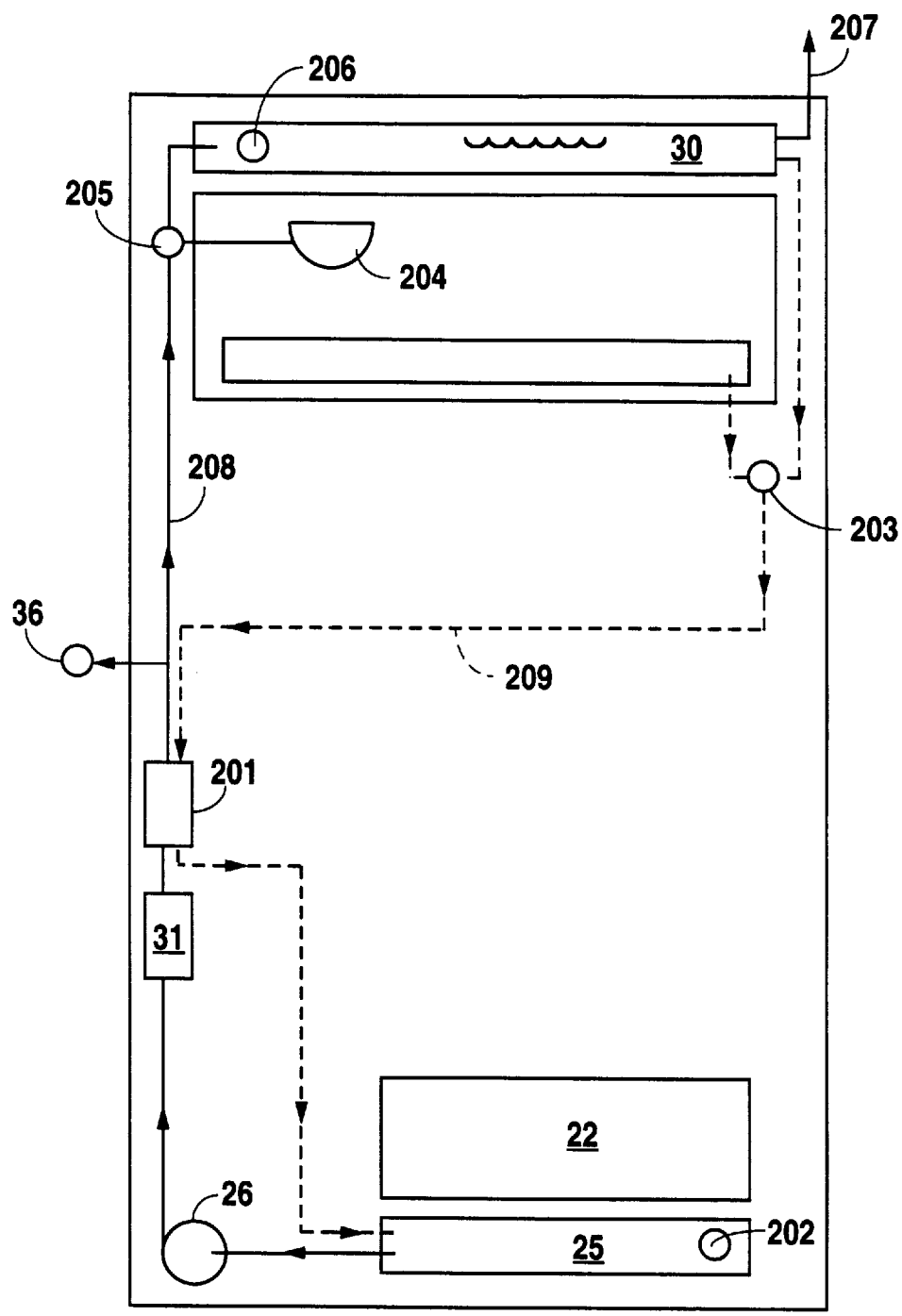

Stand-alone refrigerator with ice maker and integrated water generator—no water connection required. This example is an extension of Example M13 above, which discloses an embodiment of this invention integrated with or into a refrigerator/icemaker which requires a water supply for making ice, but generates its own potable water for dispensing. It is envisioned that the water generator of this invention could be added: (a) as a field modification to a typical refrigerator/icemaker or (b) a factory-integrated version. The resulting hybrid appliance would have the capability of generating its own potable water which is available delivered as potable-water ice or dispensed as liquid potable water. FIG. 18a shows a schematic refrigerant-flow diagram of one such embodiment. This particular embodiment includes two "AND" valves, (222) and (223), which are controlled to allow flow of refrigerant to heat absorber-1 (22) and/or (225) the evaporators of the refrigerator, i.e., the freezer compartment and the icemaker, if fitted. These "AND" valves permit operation of the water generator alone or the regular systems alone, or any combination of partial flows partitioned according to user control settings or demand sensed automatically by the system. Alternatively, an interconnected series of 3-port reversing valves and tubing manifolds can be used to accomplish the same degree of independent operation of the water generator and the regular systems. Either "AND" or reversing refrigerant valves provide for efficient switching of the basic reverse-cycle apparatus between the usual refrigerator/icemaker functions and the additional functions of the water generator and its optional dispensor reservoirs. It is believed that either of these illustrative circuits will also be extremely conservative ralative to energy consumption and energy efficiency. FIG. 18b shows the schematic potable-water flow circuit including optional UV bacteriostat (201) and charcoal-type filter (31) for removal of adsorbable/absorbable dissolved or dispersed contaminants. The filter (31) in this embodiment can be any known type of disposable filter which is able to reduce dissolved and dispersed impurities to low levels required by NSF Std.53. The filter may include screen, depth and porous adsorbent elements or stages prepared from known materials. Continual recirculation is provided by the pump (26) and the recirculation control (202); this sensor can be set to cause recirculation for a preset time duration at any predetermined time interval, even if the level in the collector (25) is at the "full" level. The UV radiation module (201) can include any type of known UV source including gas plasma tubes, lasers, and solid-state UV sources. As shown, the return flow (209) passes through the active-radiation field of the UV bacteriostat (201). The wavelength, radiant energy level and water flow rate are adjusted to provide sufficient UV exposure for effective killing of bacteria An additional feature of this embodiment is the auto-defrost water-recovery system which recycles melted frost from the freezer evaporator into the potable water circuit; the potable water circuit includes an "OR" valve (203) which is controlled to collect melted frost from the freezer during auto-defrost operations. This circuit includes a vented reservoir (207) and (30) respectively and a gravity-flow water-recirculation path (209).

Example M17

Figure 19A:
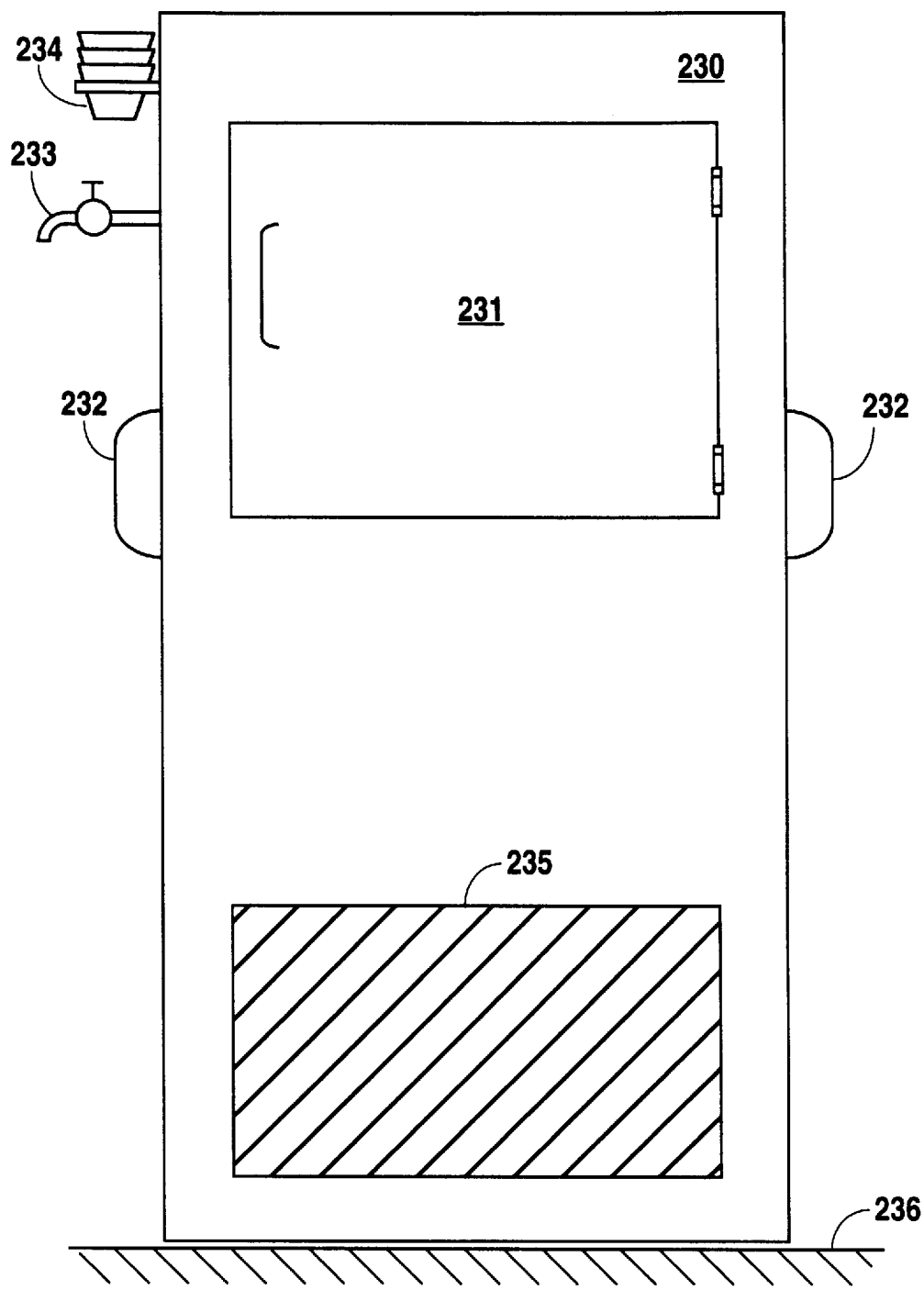
FIG. 19a is a front-elevation exterior view of a hybrid appliance for making ice, dispensing water and generating all its own water using a water generator according to the present invention. This appliance generates its own water for making ice and dispensing by condensation of water vapor from room air.
Figure 19B:
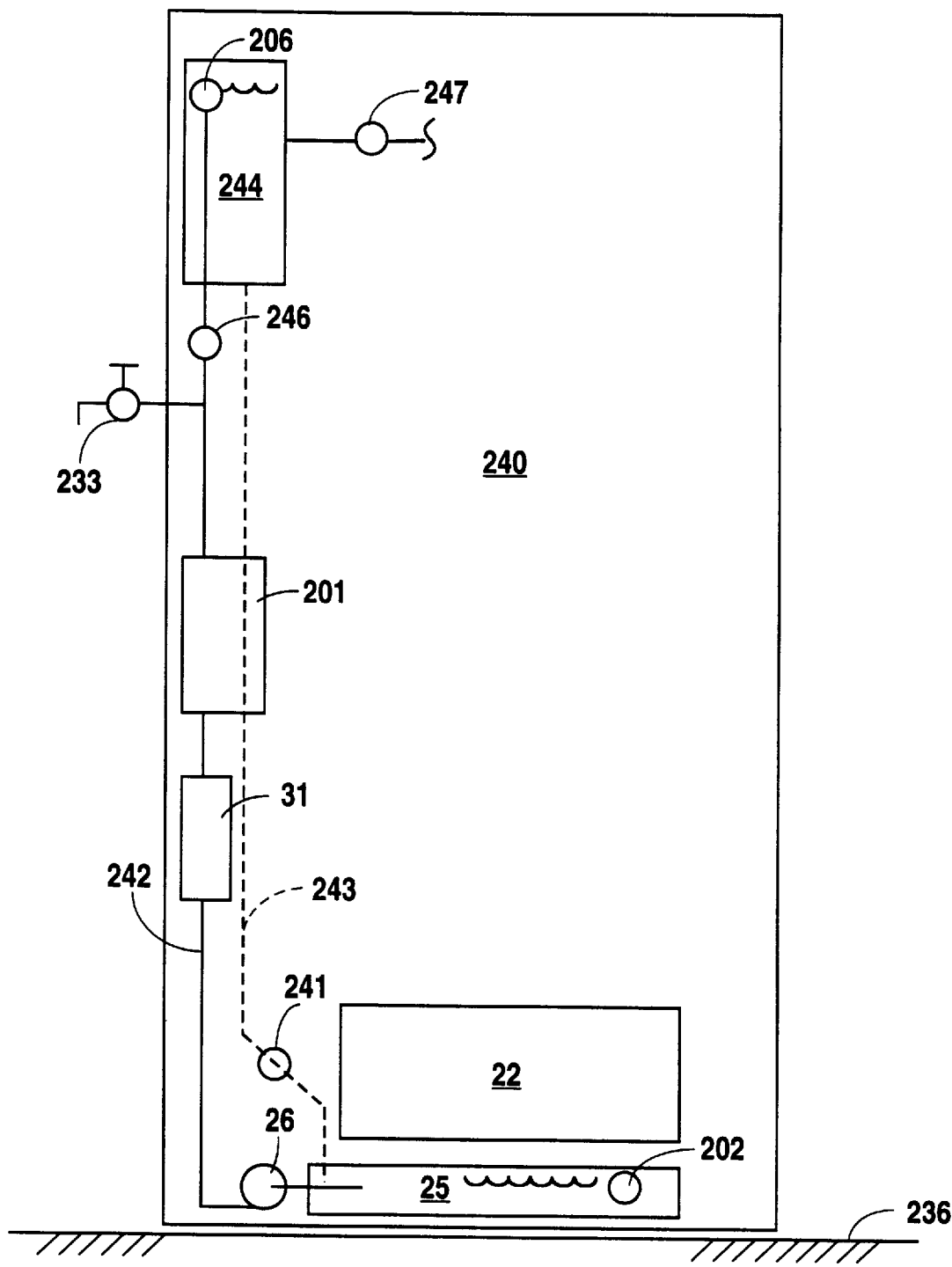
FIG. 19b is a schematic cut-away view of the appliance shown in FIG. 19a showing the potable water flow loop.

Stand-alone icemaker with integrated water generator—no water connection required This example is an extension of Example M13 above, which discloses an embodiment of this invention integrated with or into a icemaker which does require a water supply for making ice. FIG. 19a shows the front elevation view of a hybrid icemaker/potable-water dispenser (230) which generates its own water supply by means of an integrated embodiment of the present invention. This unit may be floor supported as shown, or may rest upon a supporting surface (236), is moveable by one or two persons taking hold of the lifting handles (232). The general arrangement includes a hinged door (231) into the internal ice compartment; the icemaker freezes solid ice shapes and they fall into the holding bin as they are produced. The internal components include the water generator of the present invention connected into the refrigeration system of the icemaker. Such a unit could be made as a factory-version icemaker or a field retrofit kit added to an existing standard icemaker. The unit may have an one or more optional external delivery faucets for liquid potable water (233) at predetermined temperatures e.g., room temp, cooled, or heated. For convenience, the unit may also be fitted with an optional protective holder/dispenser means (234) to deliver clean, fresh, disposable drinking cups. In this illustrative embodiment, a protective intake grille (235) is shown in front of the intake-air filter of the water generator. FIG. 19b shows a schematic view of one illustrative embodiment of the potable-water loop within the illustrative appliance of FIG. 19a. In this cut-away, sectional view, the shell of the cabinet is denoted as (240); one or more optional external faucets for dispensing potable water at one or more selected temperatures is indicated by (233). The cabinet is shown resting upon the floor or a supporting surface (236). The refrigeration system of the icemaker provides fluid to the heat abosrber of the water generator (22) under the system control with user adjustments. Filtered environmental air is circulated across (22) and cooled; resulting liquid water condensate is collected in the collector (25). The electric pump (26) operates in response to control signals generated by the level controller,(202); this controller can enable pump operation to deliver condensate fluid to the pressurized reservoir (244): (a) upon call from the icemaker supply valve (247), (b) upon demand from the external potable-water dispensers (245) or at predetermined time intervals for the purpose of continual recirculation and resterilization of the reservoir contents through the UV radiation module (201). The UV exposure module (201) may be fitted with any UV source which produces effective wavelengths and intensities for sufficient time duration to effect killing of bacteria in the water stream; such UV sources include but are not limited to gas-plasma tubes, solid-state emitters, fluorescent emitters, natural sources, etc. This illustrative loop also includes a trim valve (241) which controls the water flow rate; for the simplest embodiment, it can be a known metering valve which may be manually preset to a selected max. flow when the pump is enabled for periodic recirculation or in any case when the water flow rate exceeds the sum of demands. Alternatively, this trim valve may include attached or integrated electromechanical or electronic sub-systems such as sensors/actuators/drivers responsive to digital/analog user inputs to the control system(s)/algorithm(s). The filter (31) in this embodiment can be any known type of disposable filter which is able to reduce dissolved and dispersed impurities to low levels required by NSF Std.53. The filter may include screen, depth and porous adsorbent elements or stages prepared from known materials including but not limited to non-woven fabric, porous elements in the form of membranes, granules and other formed-media shapes and rings, saddles, etc., as well as bonded, porous charcoal preforms. Continuing intermittent recirculation is provided by the pump (26) and the recirculation control (202); this sensor can be set to cause recirculation for a preset time duration at any predetermined time interval, even if the level in the collector (25) is at the "full" level. The UV radiation module (201) can include any type of known UV source including gas plasma tubes, lasers, and solid-state UV sources. As shown, the pressurized return flow (243) passes through the active-radiation field of the UV bacteriostat (201). The wavelength, radiant energy level and water flow rate are adjusted to provide sufficient UV exposure for effective killing of bacteria As mentioned above the recirculation flow rate is limited by the trim valve (241). This illustrative embodiment includes a pressurized reservoir (244) fitted with a gas-filled bladder or an airspace as shown; the reservoir water-inlet check valve (246) prevents water from flowing backwards from the reservoir and into the supply channel (242). The level of liquid water in the reservoir is controlled by (206) which senses the level and/or pressure; it is responsive to system control signals for maintaining the water level/pressure according to demand for ice or potable water or preset system commands for periodic recirculation of water already in the reservoir.

Persons skilled in the art may conceive of other alternative embodiments and combinations of additional features and subsystems to those disclosed and still not depart from the broad scope of the present invention as claimed below.

I claim:

1. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dew-point of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, j. a monitor disposed within the housing for monitoring housing integrity and proper operation of system components therein and k. further wherein the air inlet port and the air outlet port are both covered by insect-proof screens and all seams and openings of the housing are fitted with barriers and seals to repel and prevent entry of insects and airborne contaminants.

2. The system of claim 1, and further comprising a first subsystem located within said housing and connected to said closed-loop re-circulation channel for providing, holding and dispensing from the housing chilled, purified water at a predetermined temperature range of 5–15 deg. C.

3. The system of claim 1, and further comprising a second subsystem located within said, housing and connected to said re-circulation channel for providing, holding and dispensing from the housing heated purified water at a predetermined temperature of 60–80 deg. C.

4. The system of claim 1, wherein:
   a. said enclosed cooler comprises a closed-system compression-refrigeration ("C-S C-R") unit filled with a refrigerant, said C-S C-R unit also being fitted with an upstream, electric-resistance air-heater, which is automatically regulated by thermal sensors, located in the air downstream of said enclosed cooler to prevent formation of ice on cooling surfaces of said enclosed cooler,
   b. said enclosed cooler having one or more closed channels thermally connected to an array of extended-surface elements located in a flowing stream of filtered air, said closed channels having temperature-controlled flow of said refrigerant therein,
   c. wherein said upstream electric-resistance air-heater is disposed in said system to maintain said enclosed cooler in an ice-free state below dew point temperature of said flowing stream of air by automatic, controlled heating of incoming air, and
   d. further wherein said second subsystem for providing, holding and dispensing heated, purified water is a temperature-controlled, auxiliary evaporator of said closed-system, compression-refrigeration unit located in thermal contact with the bottom surface of a second enclosed water reservoir, said second enclosed water reservoir being thermally insulated and fitted with a horizontally-oriented, fluid-convection-inhibiting, thermal-insulating, separator baffle, the baffle being located above a bottom surface of said second enclosed water reservoir and being adapted to trap cold water below said baffle.

5. A portable, potable water recovery and dispensing system comprising:
   a. a portable housing having an air inlet port and an air exhaust port,
   b. a system for circulating air from the air inlet port to the air exhaust port,
   c. at least one air filter adapted to remove and trap particulates having a diameter larger than 1–10 micrometers dispersed in ambient air, said particle-generating device sealingly connected upstream of said at least one air filter,
   d. said air exhaust port being adapted to mount an optional charged-particle generator inside said housing whereby a physiologically-safe level of charged particles and ions is added to the air being discharged,
   e. said system for circulating air further comprising an internal, ducted, air-circulation device of controllable, variable flow volume sealingly connected downstream of the at least one air filter for causing variable flow intake of ambient air,
   f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel,
   g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn,
   h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses,
   i. a delivery channel sealingly connected to said first enclosed water reservoir and extending through said housing for external dispensing of purified water from said first enclosed water reservoir, and
   j. a monitor disposed within the housing for monitoring housing integrity and proper operation of system components therein,
   wherein said air inlet port and air exhaust port each have a cross-sectional area in the range of 0.1 to 0.5 m².

6. A portable, potable water recovery and dispensing system comprising:
   a. a portable housing having an air inlet port and an air exhaust port,
   b. a system for circulating air from the air inlet port to the air exhaust port,
   c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein said variable flow volume of said system for circulating air is in the range of 1–10 m³/min.

7. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein said first enclosed water reservoir has a volume in the range of 1–10 liters.

8. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein said monitor is interconnected with system components within said housing and comprises fail safe sensors and alarms which continually verify integrity, function and operation of each component within predetermined pressure, temperature and flow-rate control parameter limits, and operate to shut down the water recovery system and prevent water from being dispensed from the housing if there should occur excessive deviations from the predetermined parameter limits.

9. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, and further comprising a first substytem located within said housing and connected to said closed-loop re-circulation channel for providing, holding and dispensing from the housing chilled, purified water at a predetermined temperature range of 5–15 deg. C, and still further comprising thermostat/humidistat controls which are automatically regulated by thermal sensors located in the air downstream of said enclosed cooler to prevent formation of ice on cooling surface of said enclosed cooler.

10. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the bacteriostatic loop includes a UV treatment zone in which the UV source is selected from the group consisting of electronic solid-state UV devices, natural sunlight light pipes and fluorescent/chemiluminescent sources.

11. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the system for circulating air further comprises an electro-chemical generator to generate sterilizing gas, such as halogen, which gases so generated can be electrochemically dissociated in liquid solution and released.

12. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, and further comprising a ducted particle-generating device sealingly connected downstream of said air inlet port, the ducted particle-generating device being provided with at least one of: (1) electrodes for generating charged particles and ions, or (2) one or more radio-isotope sources for emitting charged particles, said particle-generating device being sealingly connected to said air inlet port, wherein the ducted particle-generating device includes a source of charged particles and ions, said source being selected from the group consisting of isotope mixtures and decomposition-results alloys of radioactive metals, to thereby permit control of particle fluxes and incorporation of small area sources of charged particles into said system.

13. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dew-point of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the refrigerant is a low-temperature refrigerant fluid such as 406A to thereby permit operation of the system in air-conditioned environs.

14. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dew-point of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, a delivery channel sealingly connected to said first enclosed water reservoir and extending through said housing for external dispensing of purified water from said first enclosed water reservoir, and j. a monitor disposed within the housing for monitoring housing integrity and proper operation of system components therein, and further comprising a second subsystem located within said housing and connected to said re-circulation channel for providing, holding and dispensing from the housing heated purified water at a predetermined temperature of 60–80 deg. C;

wherein the re-circulation channel includes a heat sink for use of the system in an air conditioned environment, the heat sink being so disposed in the housing to permit passage of heat collected into either one or both of the structure of the housing and liquid water collected in a third enclosed water reservoir.

15. The system of claim 8, wherein the system components that are interconnected with the monitor include a thermostat/humidistat control for use of the system in an air conditioned environment, and further the housing being truncated by a horizontal plane at the vertical height of the bottom of an alcove assembly within which the housing is disposed, the first enclosed water reservoir being located on the floor substantially adjacent or beneath the housing.

16. The system of claim 15, wherein the vertical height of the bottom of the alcove assembly is in the range of approximately 0.8 m the proximity 1.5 m above the floor.

17. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the first-enclosed water collection vessel is covered, has a large volume capacity, and is external from the housing, but sealingly connected thereto in a manner sufficient to prevent entry of insects, dust and miscellaneous debris.

18. The system of claim 17, wherein the housing includes an adjustable weight or mass-sensing device mounted on the top surface of the housing, the adjustable weight or mass sensing device supporting the external water reservoir in vertical relationship above the housing.

19. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the housing is adapted for receipt of a gravity type water container dispenser, and further comprising a retrofitting kit including a gravity type water container dispenser for connection to the housing, the kit comprising an adjustable vertically disposed water delivery tube, a rubber seal collar and an integral water level sensor at the uppermost end of the water delivery tube, whereby the water level sensor detects when the water reservoir on the housing is filled to capacity and serves to shut off a valve of the water generator.

20. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the system is adapted for attachment to the cooling and automatic ice making subsystems of a conventional refrigerator, and further comprising appropriate fluid couplings and electrical circuitry to connect the water condenser within the housing to such conventional refrigerator to thereby permit the conventional refrigerator to generate mineral free potable water for dispensing directly as ice water or for automatic preparation of mineral-free ice cubes.

21. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dew-point of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the system is adapted for integration with a vapor-compression refrigeration-type appliance, wherein circulation air from the system is drawn over the water generator in the housing of the system and the heat absorbers of the system are adapted to draw liquid refrigerant from the vapor-compression refrigeration type appliance, to thereby permit the housing of the system to be substantially smaller than would otherwise be possible without use of such integrated arrangement.

22. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dew-point of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, and further comprising a kit to modify fluid fittings and electrical circuits of the system to permit attachment of the system to a conventional ice maker, air conditioner or dehumidifier, to thereby provide a hybrid appliance capable of generating potable water as well as performing the normal function of the conventional icemaker, air conditioner or dehumidifier.

23. The system of claim 20, and further comprising means for switching the hybrid appliance to provide either potable water ice or liquid potable water, as desired by the user.

24. The system of claim 20, wherein the system is integrated with a conventional ice maker so as to provide a stand-alone ice maker not requiring plumbing connected to an independent water supply, wherein the housing of the system includes an internal ice compartment with a holding bin for receiving ice which freezes in the system and falls into a holding bin, and further including a trim valve to control the water flow rate and a filter to reduce, dissolve and disburse impurities to potable water standards.

25. A portable, potable water recovery and dispensing system comprising:

a. a portable housing having an air inlet port and an air exhaust port, b. a system for circulating air from the air inlet port to the air exhaust port, c. at least one air filter adapted to remove and trap particulates having a diameter larger than 1–10 micrometers dispersed in ambient air, said particle-generating device sealingly connected upstream of said at least one air filter, d. said air exhaust port being adapted to mount an optional charged-particle generator inside said housing whereby a physiologically-safe level of charged particles and ions is added to the air being discharged, e. said system for circulating air further comprising an internal, ducted, air-circulation device of controllable, variable flow volume sealingly connected downstream of the at least one air filter for causing variable flow intake of ambient air, f. a water condenser within the housing comprising an enclosed cooler having dew-forming surfaces sealingly connected to a heat absorber to receive particle-free air from said system for circulating air, said dew-forming surfaces being adapted to cool boundary-layer air adjacent to said dew-forming surfaces to a temperature in the range of 1–10 deg. C below the equilibrium dewpoint of the inlet air stream, thereby forming liquid water on said dew-forming surfaces, said dew-forming surfaces being formed and positioned for gravity flow of said liquid water into an enclosed dripoff water collection vessel, g. a first enclosed water reservoir formed of material appropriate for storage of high-purity drinking water, said first enclosed reservoir being sealingly connected to said enclosed dripoff water collection vessel and fitted with an outlet connection whereby at least most of the water held within said first enclosed water reservoir can be withdrawn, h. a bacteriostatic loop sealingly connected to said first enclosed water reservoir and comprising a closed-loop, re-circulation channel and pump assembly by which water in said first enclosed water reservoir is pumped at a predetermined flow rate through an activated-carbon porous filter-absorber connection in series with a UV treatment zone where the water is continually exposed to radiation of sufficient energy and appropriate wavelength to kill bacteria and viruses, i. a delivery channel sealingly connected to said first enclosed water reservoir and extending through said housing for external dispensing of purified water from said first enclosed water reservoir, and j. a monitor disposed within the housing for monitoring housing integrity and proper operation of system components therein, wherein the bacteriostatic loop provides filtration and bacteriostatic treatment sufficient to render water recovered and dispersed by the system at purity levels at least equivalent to NSF 53 standards.

26. A process for preparing and dispensing potable water by condensation of moisture from ambient air carried out within a portable device, the process comprising:

a. removing particulate contaminants from ambient air by drawing a flowing stream of ambient air through a channel within the portable device, the channel being fitted with electrostatic particle separators and particle filters, b. cooling the stream of particle-free air produced in step (a) by closed-system, forced convection across chemically-inert cooled dew-forming surfaces in a heat absorber to at least 3 deg. C below the equilibrium dew point temperature of the stream of particle-free air, c. allowing liquid water formed on the cooled, dew-forming surfaces to flow under gravitational forces to a predetermined, enclosed dew-dripoff collection zone within the portable device, d. collecting said drip off liquid water in a non-corroding reservoir within the portable device, e. continually circulating said collected liquid water in the reservoir through a bacteriostatic treatment loop within the device wherein any microorganisms in the water are killed and any absorbable dissolved or dispersed contaminants are removed by activated-carbon filtration, and f. selectively dispensing water stored in the reservoir from the portable device, wherein all steps of the process are accomplished while monitoring integrity and operation of the portable device to within the range of preselected parameters, whereby any impurities detectable in said dispensed water are within safe levels for potable water and wherein all said process steps are accomplished by electrically powered subsystems mounted within an enclosure, all seams and openings of the enclosure being fitted with barriers and seals to repel and prevent entry of insects and airborne contaminants.

27. The process of claim 26, wherein step (f) is accomplished by operating a remote dispensing valve to dispense water into a branch line connected to the treatment loop to permit dispensing water to an external location.

28. The process of claim 26 and further comprising the additional step following step (f) of g. cooling, holding and dispensing of chilled water produced in the portable device, the chilled water being in the temperature range of 5–15 deg. C.

29. The process of claim 26, and further comprising the additional step, following step (f) of g. heating, holding and dispensing of heated water produced in the portable device, the heated water being in the temperature range of 60–80 deg. C.

* * * * *

UNITED STATES PATENT AND TRADEMARK OFFICE
CERTIFICATE OF CORRECTION

PATENT NO. : 5,845,504
DATED : December 8, 1998
INVENTOR(S) : LeBleu, T. L.

It is certified that error appears in the above-indentified patent and that said Letters Patent is hereby corrected as shown below:

IN THE CLAIMS:

Column 35, Claim 14, line 12, replace "a." with --i.--.

Signed and Sealed this

Twenty-seventh Day of July, 1999

*Attest:*

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,845,504
DATED : December 8, 1998
INVENTOR(S) : LeBleu

It is certified that error appears in the above-identified patent and that said Letters Patent is hereby corrected as shown below:

Column 24, Claim 1a, Line 35, insert after exhaust port, --and seams and openings--, Column 31, Claim 10h, Line 21, insert after treatment zone --having a UV source--, Column 34, Claim 13, after Line 26, add new paragraph:
--k. wherein said cooler comprises a closed-system compression-refrigeration ("C-S C-R") unit filled with a refrigerant, said C-S C-R unit also being fitted with an upstream, electric-resistance air-heater, which is automatically regulated by thermal sensors, located in the air downstream of said enclosed cooler to prevent formation of ice on cooling surfaces of said enclosed cooler,--

Column 36, Claim 17, Line 32, replace "collection vessel" with --reservoir--,

Column 35, Claim 17, Line 45, insert after exhaust port --and a top surface--,

UNITED STATES PATENT AND TRADEMARK OFFICE
CERTIFICATE OF CORRECTION

PATENT NO. : 5,845,504
DATED : December 8, 1998
INVENTOR(S) : LeBleu

It is certified that error appears in the above-identified patent and that said Letters Patent is hereby corrected as shown below:

Column 39, Claim 22, Line 41, insert after system --having fluid fittings and electrical circuits and further--

Signed and Sealed this

Ninth Day of May, 2000

Attest:

Q. TODD DICKINSON

*Attesting Officer*  *Director of Patents and Trademarks*

UNITED STATES PATENT AND TRADEMARK OFFICE
Certificate

Patent No. 5,845,504

Patented: December 8, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Terry L. LeBleu, San Antonio, TX; Steve LeBleu, San Antonio, TX; and Francis C. Forsberg, Boerne, TX.

Signed and Sealed this Eighth Day of May, 2001.

CORRINE M. MCDERMOTT
*Supervisory Patent Examiner*
Art Unit 3738